(12) United States Patent
Sakaguchi et al.

(10) Patent No.: US 8,649,636 B2
(45) Date of Patent: Feb. 11, 2014

(54) SUPER-RESOLUTION PROCESSOR AND SUPER-RESOLUTION PROCESSING METHOD

(75) Inventors: Satoshi Sakaguchi, Osaka (JP); Kenji Takita, Osaka (JP); Toru Matsunobu, Osaka (JP)

(73) Assignee: Panasonic Corporation, Osaka (JP)

( * ) Notice: Subject to any disclaimer, the term of this patent is extended or adjusted under 35 U.S.C. 154(b) by 35 days.

(21) Appl. No.: 13/530,283

(22) Filed: Jun. 22, 2012

(65) Prior Publication Data

US 2013/0034271 A1 Feb. 7, 2013

(30) Foreign Application Priority Data

Jun. 24, 2011 (JP) ................................. 2011-141231

(51) Int. Cl.
*G06K 9/32* (2006.01)
(52) U.S. Cl.
USPC .......................................................... 382/299
(58) Field of Classification Search
USPC ........................... 382/298–300; 345/698, 699
See application file for complete search history.

(56) References Cited

U.S. PATENT DOCUMENTS

| | | | | |
|---|---|---|---|---|
| 6,434,280 B1 * | 8/2002 | Peleg et al. | ................... | 382/299 |
| 6,766,067 B2 * | 7/2004 | Freeman et al. | ............. | 382/299 |
| 7,941,004 B2 * | 5/2011 | Zhu et al. | ...................... | 382/299 |
| 8,170,376 B2 * | 5/2012 | Matsumoto et al. | .......... | 382/299 |
| 8,520,736 B2 * | 8/2013 | Topiwala | ................. | 375/240.16 |
| 2004/0218834 A1 * | 11/2004 | Bishop et al. | .................. | 382/299 |
| 2005/0219642 A1 * | 10/2005 | Yachida et al. | ............... | 358/448 |
| 2006/0290950 A1 * | 12/2006 | Platt et al. | ...................... | 358/1.2 |
| 2007/0041663 A1 * | 2/2007 | Cho et al. | ...................... | 382/299 |
| 2008/0267533 A1 * | 10/2008 | Ida et al. | ....................... | 382/299 |

OTHER PUBLICATIONS

William T. Freeman et al., "Example-Based Super-Resolution", IEEE Computer Graphics and Applications, Mar.-Apr. 2002.
Hiroshi Yasuda et al., "Fundamentals of Digital Image Compression—Basic Principle and Application", Nikkei BP Publishing Center, Jan. 20, 1996, Section 1.3.2 (p. 44, 4th line from the bottom to p. 47, 7th line from the bottom), with English translation.

* cited by examiner

*Primary Examiner* — Shervin Nakhjavan
(74) *Attorney, Agent, or Firm* — Wenderoth, Lind & Ponack, L.L.P.

(57) ABSTRACT

A super-resolution processor in one aspect of the present invention first estimates a motion between an input image and a delayed input image which is obtained by delaying the input image by some frames, and determines a motion vector in super-resolution processing of adding a high frequency component using a learning database. Subsequently, the super-resolution processor updates an evaluation value evaluated when a patch is extracted in a target block of the input image, so that a learned high frequency patch is likely to be selected, the learned high frequency patch being the same as the learned high frequency patch used for super-resolution processing performed at the position motion-compensated by the motion vector in the frame at the same time as the time of the delayed input image.

15 Claims, 13 Drawing Sheets

FIG. 5
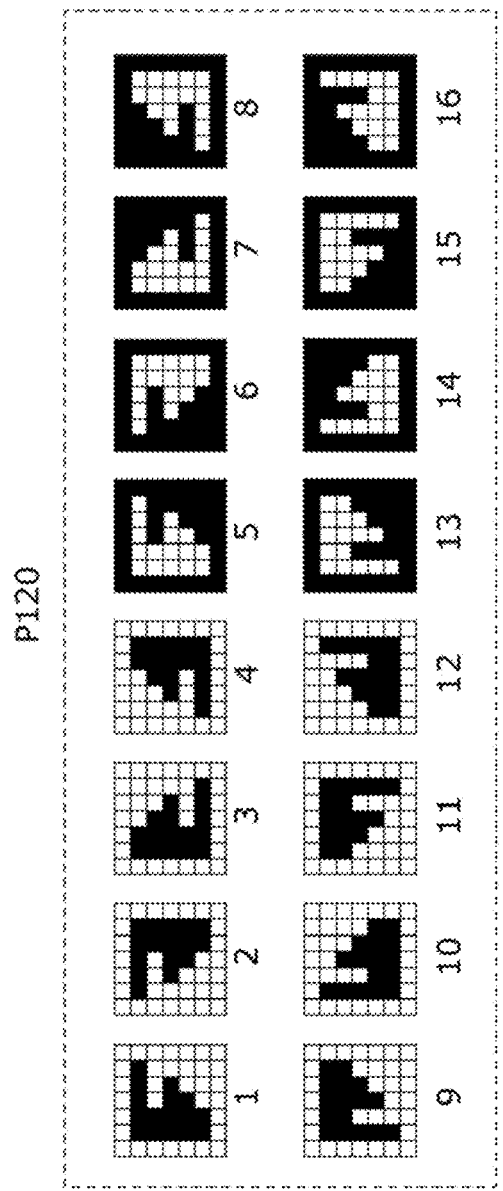

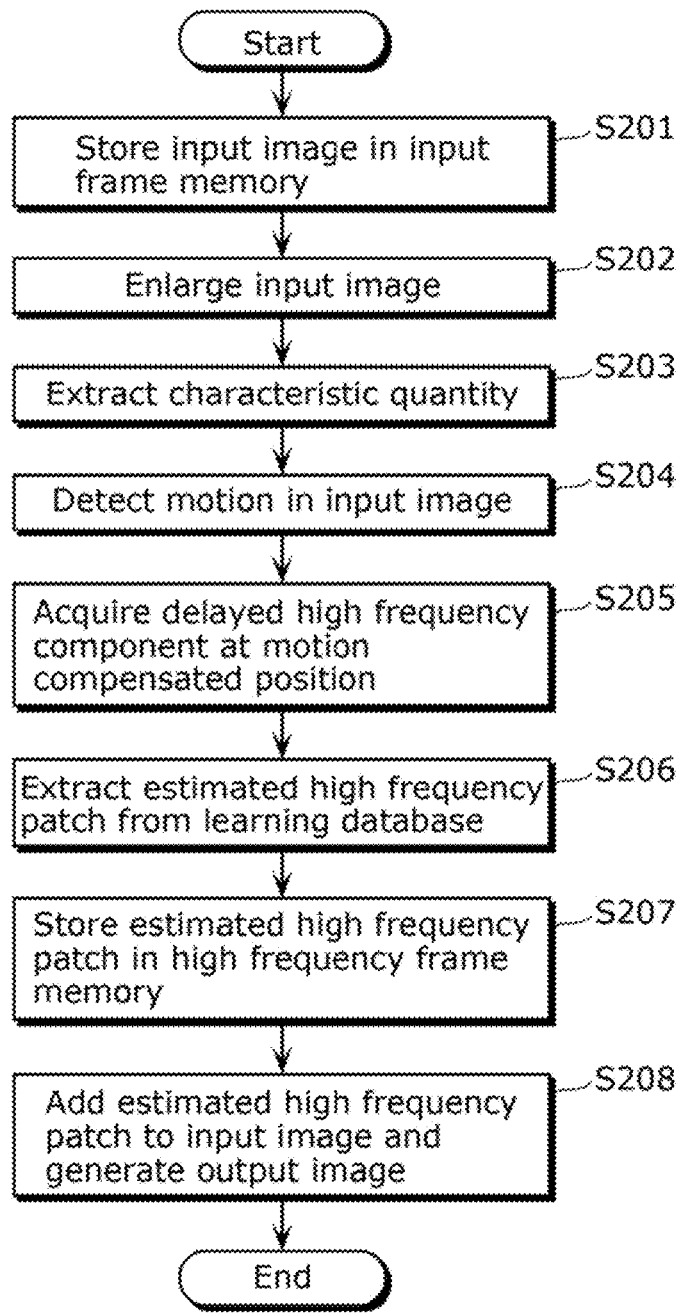

SUPER-RESOLUTION PROCESSOR AND SUPER-RESOLUTION PROCESSING METHOD

CROSS REFERENCE TO RELATED APPLICATION

The present application is based on and claims priority of Japanese Patent Application No. 2011-141231 filed on Jun. 24, 2011. The entire disclosure of the above-identified application, including the specification, drawings and claims is incorporated herein by reference in its entirety.

TECHNICAL FIELD

The present invention relates to a super-resolution processor and a super-resolution processing method which generate an output image by performing super-resolution processing on an input image using a learning database.

BACKGROUND ART

In recent years, the display resolution of a display device such as a home TV or a display for PC (personal computer) has been improved. For example, high resolution display devices with a display capability (display resolution) comparable to full high-vision (1080 pixels×1920 pixels) or higher have been developed. Thus, when an image content with standard definition (480 pixels×720 pixels) on a medium such as an existing DVD (Digital Versatile Disc) is displayed on the full screen of the above-mentioned high resolution display device, high resolution processing needs to be performed in order to increase the resolution of the images included in the image content up to the display resolution of the high resolution display device.

An enlargement processing using a linear filter is known as the current mainstream technique for high resolution processing. In addition, in recent years, a technique called super-resolution as a technique for high resolution processing has attracted attention, the super-resolution technique being capable of generating information with high resolution which does not exist in an input image (for example, see Non Patent Literature 1).

CITATION LIST

Non Patent Literature

[Non Patent Literature 1]
Freeman, W. T. Jones, T. R. Pasztor, E. C., "Example-based super-resolution", Computer Graphics and Applications, IEEE, March-April 2002
[Non Patent Literature 2]
Fundamentals of Digital Image Compression, Section 1.3.2 by Hiroshi Yasuda and Hiroshi Watanabe, Nikkei BP Publishing Center.

SUMMARY OF INVENTION

Technical Problem

In the above-mentioned conventional configuration, however, there is a problem in that an object fluctuates in time direction among a plurality of time-series image frames.

The present invention has been made in view of such a problem, and it is an object of the invention to provide a super-resolution processor and a super-resolution processing method which can suppress occurrence of a flicker among a plurality of time-series image frames.

Solution to Problem

In order to achieve the above-described object, a super-resolution processor according to an aspect of the present invention is a super-resolution processor which performs super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the super-resolution processor including: a characteristic quantity extraction unit configured to extract a characteristic quantity from the input image on a block-by-block basis; a patch extraction unit configured to calculate, on a block-by-block basis, an evaluation value which indicates a similarity between each of the learned characteristic quantities stored in the learning database and a characteristic quantity, and to extract a learned high frequency patch from the learning database, the learned high frequency patch being associated with a learned characteristic quantity most similar to the characteristic quantity indicated by the calculated evaluation value; a motion estimation unit configured to estimate a motion on a block-by-block basis between the input image and a past input image which is an image preceding the input image; a motion compensation unit configured to motion-compensate past data on a block-by-block basis based on the motion estimated by the motion estimation unit, the past data being data in which identification information for identifying a learned characteristic quantity is mapped to a corresponding block of the past input image on a block-by-block basis, the learned characteristic quantity being extracted correspondingly to the past input image by the patch extraction unit; and an adding unit configured to generate the output image by adding together on a block-by-block basis the input image and the learned high frequency patch extracted by the patch extraction unit, wherein the patch extraction unit is configured to calculate the evaluation value, and modify the evaluation value to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

These general or specific aspects may be each achieved as a system, a method, an integrated circuit, a computer program, a recording medium, or any combination thereof.

That is to say, the present invention may be achieved not only as a super-resolution processor according to an aspect as described above, but also as a super-resolution processing method which includes steps performed by distinctive units included in the super-resolution processor, or as a program which causes a computer to execute such distinctive steps. It is needless to say that such a program may be distributed via a transmission medium such as a non-transitory computer-readable recording medium such as a CD-ROM, or the Internet. In addition, the present invention may be achieved as a semiconductor integrated circuit (LSI) which implements part or all of the functions of such a super-resolution processor.

Advantageous Effects of Invention

According to an aspect of the present invention, it is possible to achieve a super-resolution processor which can suppress occurrence of a flicker among a plurality of time-series image frames.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 5 illustrates exemplary patch pairs which each have undergone image transformations stored in a learning database according to Embodiment 1;

FIG. 8 is a flowchart illustrating a super-resolution processing of the super-resolution processor according to Embodiment 2;

DESCRIPTION OF EMBODIMENTS

Embodiment 1

[Knowledge Underlying the Present Invention]

The inventor has found that the following problem occurs with the art disclosed in Non Patent Literature 1 described in the section of "background art."

As a conventional super-resolution processing method, there is known a learning-based super-resolution shown in Non Patent Literature 1. The method of Non Patent Literature 1 will be described in the following.

[Configuration and Operation 1 of Super-Resolution Processor 900]

Figure 11:
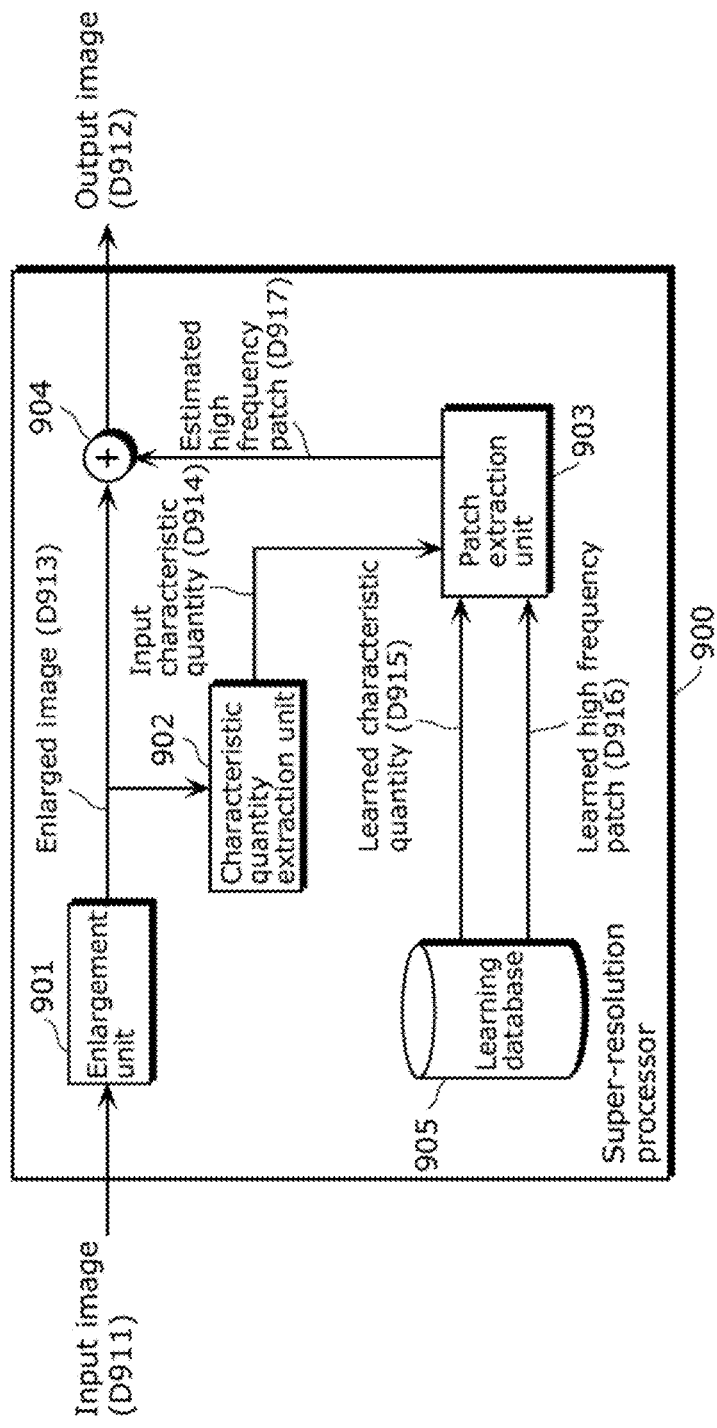
FIG. 11 is a block diagram illustrating the configuration of a conventional super-resolution processor.

FIG. 11 is a block diagram illustrating the configuration of a super-resolution processor 900. The super-resolution processor 900 illustrated in FIG. 11 includes a enlargement unit 901 which generates an enlarged image (D913) from an input image (D911) with low resolution; a characteristic quantity extraction unit 902 which generates an input characteristic quantity (D914) from the enlarged image (D913); a patch extraction unit 903 which generates an estimated high frequency patch (D917) from the input characteristic quantity (D914), a learned characteristic quantity (D915), and a learned high frequency patch (D916); an adding unit 904 which generates an output image (D912) by adding the enlarged image (D913) and the estimated high frequency patch (D917) together; and a learning database 905 which outputs the learned characteristic quantity (D915) and the learned high frequency patch (D916).

The enlargement unit 901 generates an enlarged image (D913) by enlarging the input image (D911) by a factor of N both horizontally and vertically, where N is the target resolution factor of super-resolution processing. For example, the enlargement unit 901 enlarges the input image (D911) using a pixel interpolation technique such as the Bicubic technique or the spline interpolation technique.

The characteristic quantity extraction unit 902 extracts a high frequency component of the enlarged image (D913) as an input characteristic quantity (D914) by using a linear filter operation or the like.

The patch extraction unit 903 performs the following processing on the input characteristic quantity (D914) a fixed small on a block-by-block basis. The patch extraction unit 903 searches a great number learned characteristic quantities stored in the learning database 905 (D915) for a learned characteristic quantity (D915) which is the most similar to an object image block in the input characteristic quantity (D914). Here, the patch refers to a blocked data. The patch extraction unit 903 also defines the distance between two patches by the sum of the absolute values or the sum of the squares of the differences between corresponding pixels. The patch extraction unit 903 then determines a degree of similarity according to the smallness of the distance. When the most similar learned characteristic quantity (D915) is determined by the search, the patch extraction unit 903 acquires a learned high frequency patch (D916) which is stored in pair with the learned characteristic quantity (D915) in the learning database 905, and outputs the acquired learned high frequency patch (D916) as an estimated high frequency patch (D917).

The adding unit 904 adds the patch at the position of a target block in the enlarged image (D913) and the estimated high frequency patch (D917) together pixel by pixel, and outputs the result of the addition as an output image (D912).

In the following, a method of generating the learning database 905 included in the super-resolution processor 900 will be described.

[Configuration and Operation of Learning Data Base Generation Device 950]

Figure 12:
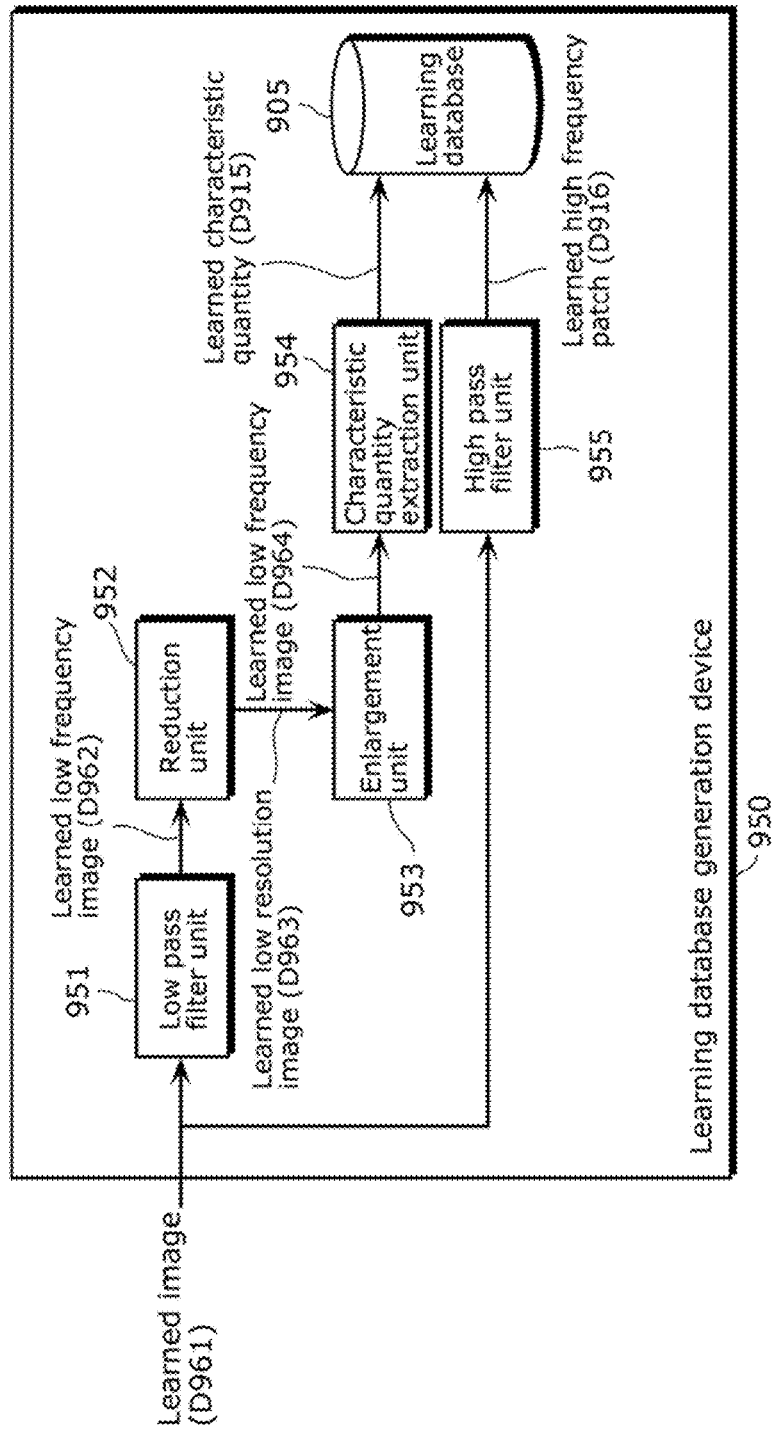
FIG. 12 is a block diagram illustrating the configuration of a learning database generation device for generating a learning database.

FIG. 12 is a block diagram illustrating the configuration of a learning database generation device 950 for generating the learning database 905. The learning database 905 includes a low pass filter unit 951 which generates a learned low frequency image (D962) from the learned images collected from actual images previously captured by a digital camera (D961); a reduction unit 952 which generates a learned low resolution image (D963) from a learned low frequency image (D962); an enlargement unit 953 which generates a learned low frequency image (D964) from the learned low resolution image (D963); a characteristic quantity extraction unit 954 which generates a learned characteristic quantity (D915) from the learned low frequency image (D964); a high pass filter unit 955 which generates a learned high frequency patch (D916) from the learned image (D961); and a learning database 905 which stores the learned characteristic quantity (D915) and the learned high frequency patch (D916).

The low pass filter unit 951 extracts a low-frequency component of the learned image (D961) as a learned low frequency image (D962) by using a linear filter operation or the like.

The reduction unit 952 generates a learned low resolution image (D963) by reducing the learned low frequency image (D962) by a factor of N both horizontally and vertically.

The enlargement unit 953 generates a learned low frequency image (D964) by enlarging the learned low resolution image (D963) by a factor of N both horizontally and vertically.

The characteristic quantity extraction unit 954 extracts a high frequency component of the learned low frequency image (D964) by using a linear filter operation or the like, and generates a plurality of learned characteristic quantities (D915) by cutting the extracted component on the above-mentioned fixed block-by-block basis.

The high pass filter unit 955 extracts a high frequency component of the learned image (D961) using a linear filter operation or the like, and generates a plurality of learned high frequency patches (D916) by cutting the extracted component on the above-mentioned fixed block-by-block basis.

The learning database 905 associates the learned characteristic quantity (D915) with the learned high frequency patch (D916) as a patch pair, the learned characteristic quantity and the learned high frequency patch being generated from the same block position. The learning database 905 then stores therein the association relationship and the data of both image patches.

[Operation 2 of Super-Resolution Processor 900]

As described above, the learning database 905 of the super-resolution processor 900 stores therein a great number of relationships between high frequency images and actual characteristic quantities collected from the actual images previously captured by a digital camera. Therefore, the super-resolution processor 900 can retrieve a high frequency image patch which is considered to be most similar to the input characteristic quantity (D914). Furthermore, by adding the retrieved high frequency image patch to the enlarged image (D913), a lost high frequency component which is not included in the input image (D911) is recovered. Accordingly, the super-resolution processor 900 can generate an output image (D912) with higher definition.

[Exemplary Operation of Super-Resolution Processor 900]

Figure 13:
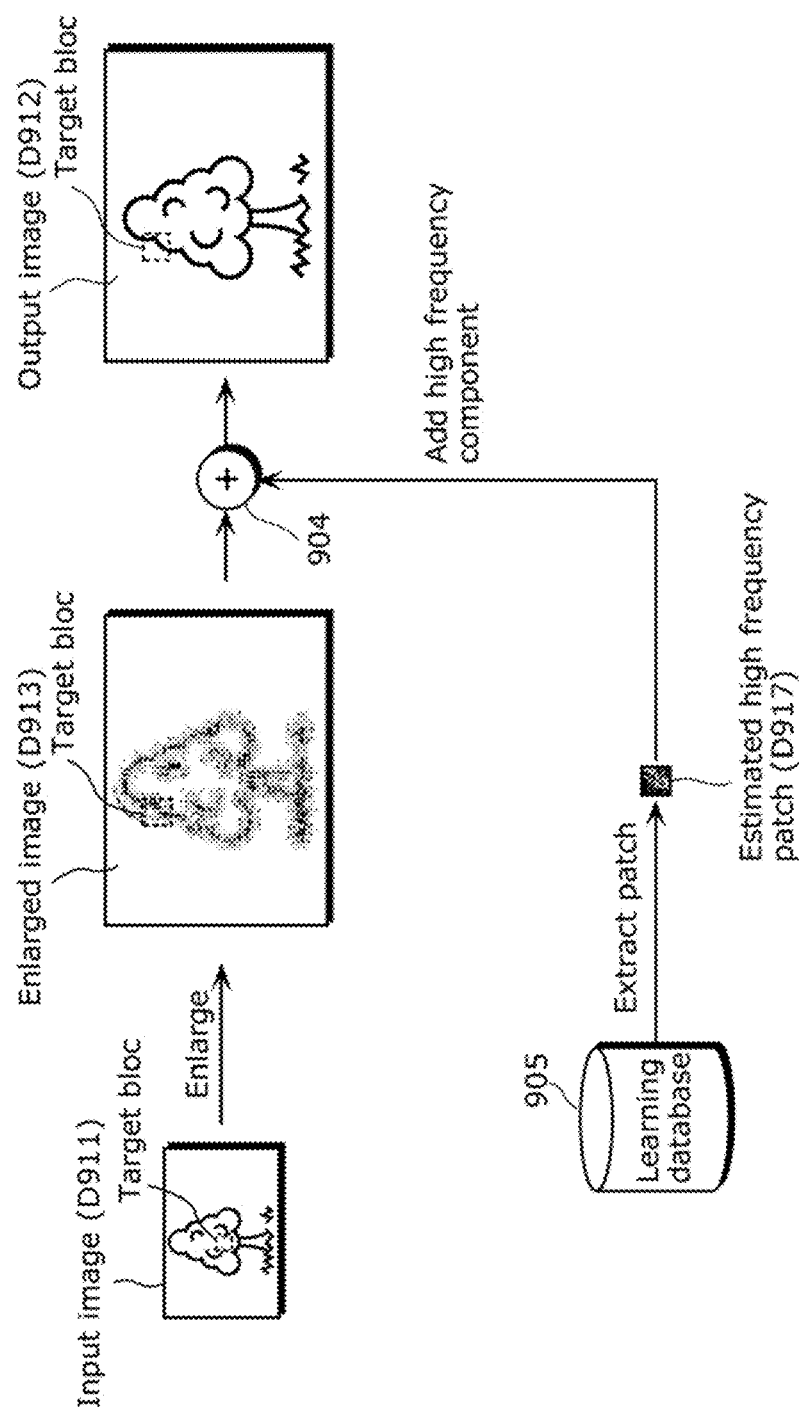
FIG. 13 illustrates an exemplary operation of a conventional super-resolution processor.

A specific exemplary operation of the super-resolution processor 900 will be described in the following. FIG. 13 illustrates an exemplary operation of the super-resolution processor 900.

FIG. 13 illustrates an operation example of how super-resolution processing is performed on the input image (D911) by the super-resolution processor 900, and an output image (D912) with high definition is generated.

When an enlarged image (D913) is generated from the input image (D911), the entire frame may be enlarged at a time, or each target block (for example, the target block in FIG. 13) may be enlarged at a time. Here, the enlarged image (D913) is an image blurred by the enlargement. On the other hand, the estimated high frequency patch, which is extracted from the learning database 905 by the patch extraction unit 903 (D917), is added to the enlarged image (D913) by the adding unit 904, thereby generating an output image (D912) with improved definition.

In the above-mentioned conventional art, however, there is a problem in that an object fluctuates in the time direction among a plurality of time-series image frames. Specifically, even when the same object is only slightly changed due to inclusion of random noise, or a movement or modification of the object itself among the plurality of time-series image frames (hereinafter simply referred to as a frame), the patch extraction unit 903 may retrieve different learned characteristic quantities (D915) for two continuous frames. Because the associated learned high frequency patches (D916) are different in this case, the respective output images (D912) which have undergone the super-resolution processing provide different images depending on the frame for the same object, thereby causing a problem that the object fluctuates in the time direction (in other words, a flicker occurs).

Thus, an aspect of the present invention has been made in view of such a problem, and it is an object of the invention to provide a super-resolution processor and a super-resolution processing method which can suppress occurrence of a flicker among a plurality of time-series image frames.

In order to achieve the above-described object, a super-resolution processor according to a first aspect of the present invention is a super-resolution processor which performs super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the super-resolution processor including: a characteristic quantity extraction unit configured to extract a characteristic quantity from the input image on a block-by-block basis; a patch extraction unit configured to calculate, on a block-by-block basis, an evaluation value which indicates a similarity between each of the learned characteristic quantities stored in the learning database and a characteristic quantity, and to extract a learned high frequency patch from the learning database, the learned high frequency patch being associated with a learned characteristic quantity most similar to the characteristic quantity indicated by the calculated evaluation value; a motion estimation unit configured to estimate a motion on a block-by-block basis between the input image and a past input image which is an image preceding the input image; a motion compensation unit configured to motion-compensate past data on a block-by-block basis based on the motion estimated by the motion estimation unit, the past data being data in which identification information for identifying a learned characteristic quantity is mapped to a corresponding block of the past input image on a block-by-block basis, the learned characteristic quantity being extracted correspondingly to the past input image by the patch extraction unit; and an adding unit configured to generate the output image by adding together on a block-by-block basis the input image and the learned high frequency patch extracted by the patch extraction unit, wherein the patch extraction unit is configured to calculate the evaluation value, and modify the evaluation value to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

With this configuration, super-resolution processing for adding a stable high frequency component to the input image can be performed, the high frequency component being resistant to fluctuations in the time direction, and thus it is possible to achieve a super-resolution processor which can suppress occurrence of a flicker among a plurality of time-series image frames.

Specifically, with the above configuration, any of the learned high frequency patches identified by identification information of the blocks of the motion-compensated past data is likely to be selected, and thus the continuity in the time direction increases, and a stable high-definition output image with less high-frequency fluctuation can be obtained.

A super-resolution processor according to a second aspect of the present invention is the super-resolution processor in the first aspect, for example, wherein the identification information is a database index for identifying a learned high frequency patch extracted correspondingly to the past input image by the patch extraction unit, and a learned characteristic quantity associated with the learned high frequency patch, and the patch extraction unit may be configured to modify the evaluation value to a value indicating a similarity greater than a similarity in the case where the identification information of the block of the past data is not used, where the evaluation value is calculated which indicates a similarity between the learned characteristic quantity identified based on the database index of the block of the past data, and the characteristic quantity associated with the block of the input image, the block of the past data being motion-compensated by the motion compensation unit and associated with the block of the input image.

With the above configuration, any of the learned high frequency patches identified by the database indexes of the blocks of the motion-compensated past data is likely to be selected, and thus the continuity in the time direction increases, and a stable high-definition output image with less high-frequency fluctuation can be obtained.

A super-resolution processor according to a third aspect of the present invention is the super-resolution processor in the first aspect, for example, wherein the identification information is a learned high frequency patch extracted correspondingly to the past input image by the patch extraction unit, and the patch extraction unit may be configured to modify the evaluation value to a value indicating a similarity greater than a similarity in the case where the identification information of the block of the past data is not used, where the evaluation value is calculated which indicates a similarity between the learned characteristic quantity associated with a learned high frequency patch of the block of the past data, and the characteristic quantity associated with the block of the input image, the block of the past data being motion-compensated by the motion compensation unit and associated with the block of the input image.

With the above configuration, any of the learned high frequency patches of the blocks of the motion-compensated past data is likely to be selected, and thus the continuity in the time direction increases, and a stable high-definition output image with less high-frequency fluctuation can be obtained.

A super-resolution processor according to a fourth aspect of the present invention is the super-resolution processor in any one of the first to third aspects, for example, wherein the evaluation value is smaller when the similarity is greater, and the patch extraction unit may be configured to modify the evaluation value to a value which is reduced by c1 (c1>0) from the evaluation value in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the blocks of the input image.

With this configuration, any of the learned high frequency patches identified by identification information of the blocks of the motion-compensated past data is likely to be selected, and thus the continuity in the time direction increases, and a stable high-definition output image with less high-frequency fluctuation can be obtained.

A super-resolution processor according to a fifth aspect of the present invention is the super-resolution processor in any one of the first to third aspects, for example, wherein the evaluation value is smaller when the similarity is greater, and the patch extraction unit may be configured to modify the evaluation value to a value which is a product between c2 (0<c2<1) and the evaluation value in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

With this configuration, any of the learned high frequency patches identified by identification information of the blocks of the motion-compensated past data is likely to be selected, and thus the continuity in the time direction increases, and a stable high-definition output image with less high-frequency fluctuation can be obtained.

A super-resolution processor according to a sixth aspect of the present invention is the super-resolution processor in any one of the first to fifth aspects, for example, wherein the motion estimation unit may be further configured to calculate motion likelihood information which indicates a likelihood of the estimated motion, and the patch extraction unit, when determining based on the motion likelihood information that the estimated motion is probable, may be configured to increase a modification value for the evaluation value, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

With this configuration, any of the learned high frequency patches identified by identification information of the blocks of the motion-compensated past data is likely to be selected, and thus the continuity in the time direction increases, and a stable high-definition output image with less high-frequency fluctuation can be obtained.

A super-resolution processor according to a seventh aspect of the present invention is the super-resolution processor in any one of the first to fifth aspects, for example, wherein the motion estimation unit may be further configured to calculate motion likelihood information which indicates a likelihood of the estimated motion, and the patch extraction unit, only when determining based on the motion likelihood information that the estimated motion is probable, may be configured to modify the evaluation value to a value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

With this configuration, any of the learned high frequency patches identified by identification information of the blocks of the motion-compensated past data is likely to be selected, and thus the continuity in the time direction increases, and a stable high-definition output image with less high-frequency fluctuation can be obtained.

A super-resolution processor according to an eighth aspect of the present invention is the super-resolution processor in the seventh aspect, for example, wherein the motion likelihood information may indicate a higher likelihood of the estimated motion for a greater similarity between the block of the past data motion-compensated by the motion compensation unit, and the block of the input image corresponding to the block of the past data.

A super-resolution processor according to a ninth aspect of the present invention is the super-resolution processor in the seventh aspect, for example, wherein the motion likelihood information may include a sum of absolute differences between pixels of the block of the past data motion-compensated by the motion compensation unit and pixels of a target block of the input image, the target block corresponding to the block of the past image.

A super-resolution processor according to a tenth aspect of the present invention is the super-resolution processor in the ninth aspect, for example, wherein in the motion likelihood information, a smaller value of the sum of absolute difference may indicate a greater similarity between the block of the past data motion-compensated by the motion compensation unit, and the block of the input image corresponding to the block of the past data.

With this configuration, any of the learned high frequency components similar to the learned high frequency patches identified by identification information of the blocks of the motion-compensated past data is likely to be selected, and thus the continuity in the time direction increases, and a stable high-definition output image with less high-frequency fluctuation can be obtained.

A super-resolution processor according to an eleventh aspect of the present invention is the super-resolution processor in any one of the first to tenth aspects, for example, wherein the super-resolution processor may further include an enlargement unit configured to enlarge the input image to a desired image size and to output the enlarged input image, wherein the characteristic quantity extraction unit is configured to extract a characteristic quantity correspondingly to the input image enlarged by the enlargement unit, and the adding unit is configured to generate the output image by adding together the input image enlarged by the enlargement unit, and the learned high frequency patch extracted by the patch extraction unit on a block-by-block basis.

A super-resolution processor according to a twelfth aspect of the present invention is the super-resolution processor in the second aspect, for example, wherein in the learning database, learned high frequency patches similar to each other are classified in a same class, and the patch extraction unit may be configured to modify the evaluation value to a value indicating a similarity greater than a similarity in the case where the identification information of the block of the past data is not used, where the evaluation value is calculated which indicates a similarity between a learned characteristic quantity in a learned high frequency patch belonging to the same class as the learned high frequency patch associated with the learned characteristic quantity which is identified based on the database index of the block of the past data, and the characteristic quantity associated with the block of the input image, the block of the past data being motion-compensated by the motion compensation unit and associated with the block of the input image.

In order to achieve the above-described object, a super-resolution processing method according to a thirteenth aspect of the present invention is, for example, a super-resolution processing method for performing super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the super-resolution processor comprising: extracting a characteristic quantity from the input image on a block-by-block basis; calculating, on a block-by-block basis, an evaluation value which indicates a similarity between each of the learned characteristic quantities stored in the learning database and a characteristic quantity, and extracting a learned high frequency patch from the learning database, the learned high frequency patch being associated with a learned characteristic quantity most similar to the characteristic quantity indicated by the calculated evaluation value; estimating a motion on a block-by-block basis between the input image and a past input image which is an image preceding the input image; motion-compensating past data on a block-by-block basis based on the motion estimated in the estimating, the past data being data in which identification information for identifying a learned characteristic quantity is mapped to a corresponding block of the past input image on a block-by-block basis, the learned characteristic quantity being extracted correspondingly to the past input image in the extracting of a learned high frequency patch; and generating the output image by adding together on a block-by-block basis the input image and the learned high frequency patch extracted in the extracting of a learned high frequency patch, wherein in the extracting of a learned high frequency patch, the evaluation value is calculated, and modified to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated in the motion-compensating and associated with the block of the input image.

In order to achieve the above-described object, a program for performing super-resolution processing according to a fourteenth aspect of the present invention is a non-transitory computer-readable recording medium on which a program is recorded for performing super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the program causing a computer to execute: extracting a characteristic quantity from the input image on a block-by-block basis; calculating, on a block-by-block basis, an evaluation value which indicates a similarity between each of the learned characteristic quantities stored in the learning database and a characteristic quantity, and extracting a learned high frequency patch from the learning database, the learned high frequency patch being associated with a learned characteristic quantity most similar to the characteristic quantity indicated by the calculated evaluation value; estimating a motion on a block-by-block basis between the input image and a past input image which is an image preceding the input image; motion-compensating past data on a block-by-block basis based on the motion estimated in the estimating, the past data being data in which identification information for identifying a learned characteristic quantity is mapped to a corresponding block of the past input image on a block-by-block basis, the learned characteristic quantity being extracted correspondingly to the past input image in the extracting of a learned high frequency patch; and generating the output image by adding together on a block-by-block basis the input image and the learned high frequency patch extracted in the extracting of a learned high frequency patch, wherein in the extracting of a learned high frequency patch, the evaluation value is calculated and modified to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated in the motion-compensating and associated with the block of the input image In order to achieve the above-described object, an integrated circuit according to a fifteenth aspect of the present invention is an integrated circuit which performs super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the super-resolution processor comprising: a characteristic quantity extraction unit configured to extract a characteristic quantity from the input image on a block-by-block basis; a patch extraction unit configured to calculate, on a block-by-block basis, an evaluation value which indicates a similarity between each of the learned characteristic quantities stored in the learning database and a characteristic quantity, and to extract a learned high frequency patch from the learning database, the learned high frequency patch being associated with a learned characteristic quantity most similar to the characteristic quantity indicated by the calculated evaluation value; a motion estimation unit configured to estimate a motion on a block-by-block basis between the input image and a past input image which is an image preceding the input image; a motion compensation unit configured to motion-compensate past data on a block-by-block basis based on the motion estimated by the motion estimation unit, the past data being data in which identification information for identifying a learned characteristic quantity is mapped to a corresponding block of the past input image on a block-by-block basis, the learned characteristic quantity being extracted correspondingly to the past input image by the patch extraction unit; and an adding unit configured to generate the output image by adding together on a block-by-block basis the input image and the learned high frequency patch extracted by the patch extraction unit, wherein the patch extraction unit is configured to calculate the evaluation value, and modify the evaluation value to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

Each of the embodiments described below illustrates a specific example of the present invention. The numerical values, shapes, materials, components, arrangement positions and topologies of the components, steps, and order of the steps that are depicted in the following embodiments are just examples, and are not intended to limit the scope of the present invention. Those components in the following embodiments, which are not stated in the independent claim that defines the most generic concept are each described as an arbitrary component.

Hereinafter, the embodiments for practicing the present invention will be described with reference to the drawings.

[Embodiment 1]

Figure 1:
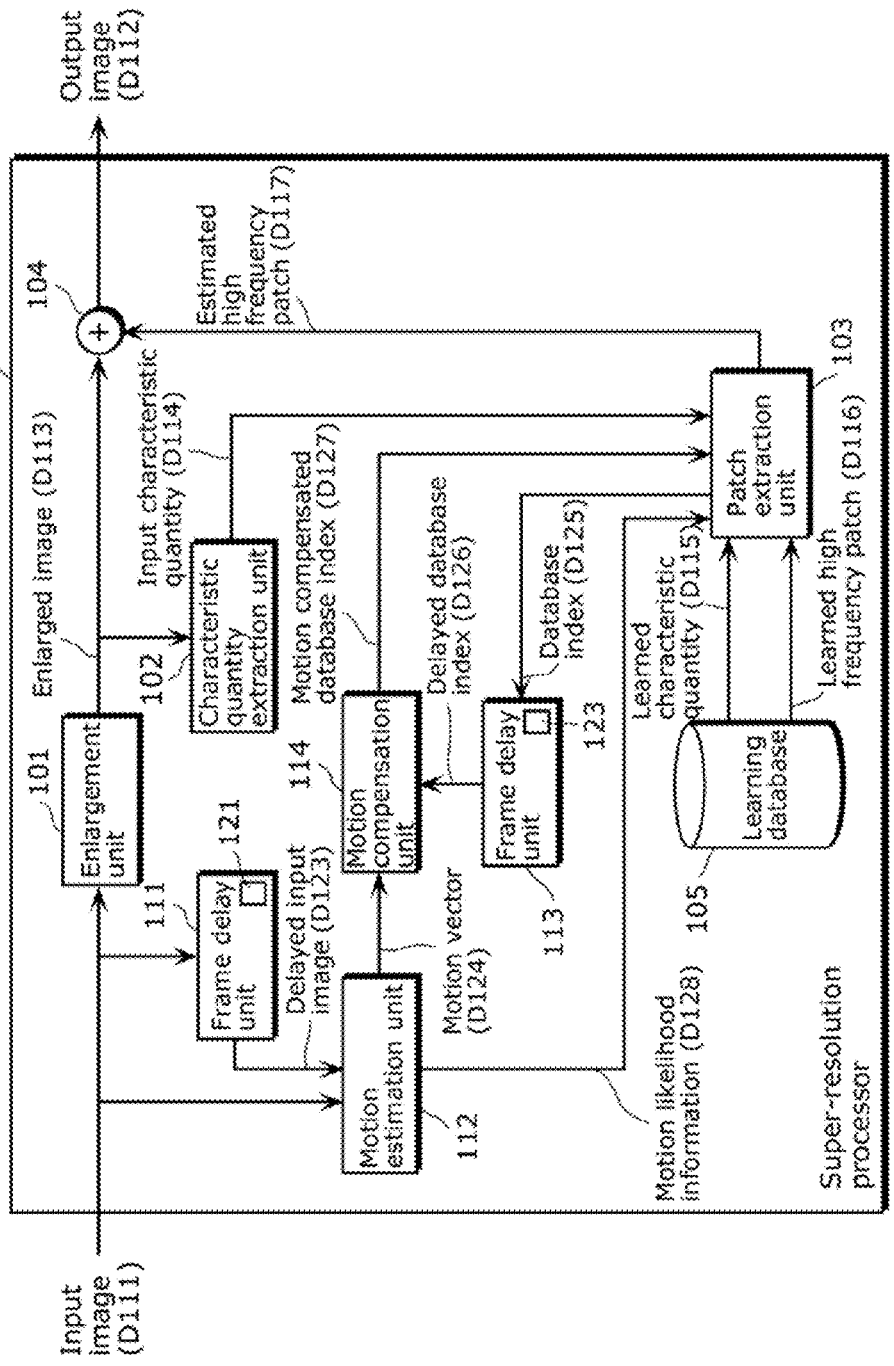
FIG. 1 is a block diagram illustrating the configuration of a super-resolution processor according to Embodiment 1.

FIG. 1 is a block diagram illustrating the configuration of a super-resolution processor 100 according to Embodiment 1.

The super-resolution processor 100 illustrated in FIG. 1 generates an output image (D112) with a resolution greater than that of an input image (D111) by performing super-resolution processing on the input image (D111) using a learning database 105. The super-resolution processor 100 includes an enlargement unit 101, a characteristic quantity extraction unit 102, a patch extraction unit 103, an adding unit 104, a learning database 105, a frame delay unit 111, a motion estimation unit 112, a frame delay unit 113, and a motion compensation unit 114.

The enlargement unit 101 enlarges the input image (D111) to a desired image size and outputs the enlarged image. Specifically, the enlargement unit 101 generates an enlarged image (D113) which is obtained by enlarging the input image (D111) to a desired size. In the case where the input image (D111) is previously enlarged, or the frequency distribution of the input image (D111) is concentrated on low frequency, a super-resolution effect is obtained without increasing the size of the input image, and thus the enlargement unit 101 may be omitted. In this case, the input image (D111) may be substituted for the enlarged image (D113).

The characteristic quantity extraction unit 102 extracts an input characteristic quantity (D114) from the input image (D111) which has been enlarged by the enlargement unit 101. Specifically, the characteristic quantity extraction unit 102 extracts a characteristic quantity from the enlarged image (D113), and outputs the characteristic quantity as the input characteristic quantity (D114). The characteristic quantity extraction unit 102 may extract the input characteristic quantity (D114) from the input image (D111) on a block-by-block basis.

Here, the characteristic quantity is, for example, a high frequency component of the enlarged image (D113), and is extracted by using a high-pass filter. The characteristic quantity is, for example, a bandpass component of the enlarged image (D113), and may be extracted by using a band pass filter. The characteristic quantity may be any characteristic quantity which is extracted from the enlarged image (D113), and may be extracted directly from the input image (D111) instead of the enlarged image (D113). In addition, the characteristic quantity may be one-dimensional scalar quantity or a vector with multiple dimensions.

The frame delay unit 111 has a first frame memory 121 therein, and delays the input image (D111) frame-by-frame using the first frame memory 121 to output a delayed input image (D123).

The motion estimation unit 112 estimates a motion on a block-by-block basis between the input image (D111) and the delayed input image (D123) preceding the input image (D111). Specifically, the motion estimation unit 112 estimates the motion of each object in the images between the input image (D111) and the delayed input image (D123), and outputs a motion vector (D124) which indicates the estimated motion (motion quantity). The estimation of a motion may be performed on a predetermined block-by-block basis, or a divided region may be arbitrarily allocated to each object in the image, and estimation may be performed region by region.

In addition, the motion estimation unit 112 calculates motion likelihood information which indicates the likelihood of estimated motion. Specifically, the motion estimation unit 112 calculates and outputs motion likelihood information (D128) which indicates the likelihood of estimated motion. Here, the motion likelihood information indicates a higher likelihood of estimated motion for a greater similarity between the blocks of the database indexes of the blocks of past data and the blocks of corresponding input images, the past data being motion-compensated by the motion compensation unit 114. For example, the motion likelihood information (D128) is the sum of absolute differences between pixels in the target block in the input image (D111) and the delayed input image (D123) at the motion-compensated position. The motion likelihood information (D128) is, for example, the sum of squared differences between pixels in the target block in the input image (D111) and the delayed input image (D123) at the motion-compensated position. In addition, the motion likelihood information (D128) may be the sum of absolute differences or the sum of squared differences between thinned-out pixels, or may be an index which is determined by another method and indicates a similarity between the target block and the delayed input image (D123) at the motion-compensated position. It should be noted that a smaller value of the sum of absolute differences indicates the motion likelihood information (D128) has a greater similarity. Optionally, any other performance index may be combined with the above-mentioned index.

The frame delay unit 113 has a second frame memory 123 therein, and delays a database index (D125) for one frame at each block position to output a delayed database index (D126).

Based on the motion estimated by the motion estimation unit 112, the motion compensation unit 114 motion-compensates the past data on a block-by-block basis, on which identification information for identifying a learned characteristic quantity (D115) is mapped to each block of the input image in the past, the learned characteristic quantity being extracted correspondingly to the input image (D111) in the past by the patch extraction unit 103. Specifically, the motion compensation unit 114 outputs a motion-compensated database index (D127) by motion-compensating the delayed database index (D126) according to the motion quantity indicated by the motion vector (D124).

It should be noted that the input image in the past herein indicates the time sequence of the input image (D111) inputted to the super-resolution processor 100. In other words, the past input image does not indicate the sequence of display (display time) of the output image (D112) outputted by the super-resolution processor 100. Similarly, the past data just indicates the data for the input image (D111) in the past.

The patch extraction unit 103 calculates an evaluation value per block, which indicates a similarity between each of a plurality of learned characteristic quantities (D115) stored in the learning database 105 and the input characteristic quantity (D114), and extracts a learned high frequency patch (D116) from the learning database 105, the learned high frequency patch being associated with the learned characteristic quantity (D115) which is the most similar to the input characteristic quantity (D114) indicated by the calculated evaluation value. In addition, the patch extraction unit 103 performs calculation by modifying the evaluation value to a value indicating a similarity greater than that in the case where identification information of the blocks of the past data is not used, where the evaluation value is calculated which indicates a similarity between the learned characteristic quantity (D115) identified based on the identification information of the blocks of the past data, and the input characteristic quantity (D114) associated with the block of the input image (D111), the blocks of the past data being motion-compensated by the motion compensation unit 114 and associated with the blocks of the input image (D111).

Here, the identification information is a database index which identifies the learned high frequency patch (D116) extracted correspondingly to the input image (D111) in the past by the patch extraction unit 103, and the learned characteristic quantity (D115) associated with the learned high frequency patch (D116). In the present embodiment, the patch extraction unit 103 modifies the evaluation value to a value indicating a similarity greater than that in the case where identification information of the blocks of the past data is not used, where the evaluation value is calculated which indicates a similarity between the learned characteristic quantity (D115) identified based on the database indexes of the blocks of the past data, and the input characteristic quantity (D114) associated with the block of the input image (D111), the blocks of the past data being motion-compensated by the motion compensation unit 114 and associated with the blocks of the input image (D111).

The greater the similarity is, the smaller the evaluation value is. In this case, the patch extraction unit 103 may modify the evaluation value to a value which is reduced by $c1(c1>0)$ from the evaluation value in the case where identification information of the blocks of the past data is not used, where the evaluation value is calculated which indicates a similarity between the learned characteristic quantity (D115) identified based on the identification information of the blocks of the past data, and the input characteristic quantity (D114) associated with the block of the input image (D111), the blocks of the past data being motion-compensated by the motion compensation unit 114 and associated with the blocks of the input image (D111). The patch extraction unit 103 may modify the evaluation value to a value which is the product between $c2(0<c2<1)$ and the evaluation value in the case where identification information of the blocks of the past data is not used, where the evaluation value is calculated which indicates a similarity between the learned characteristic quantity (D115) identified based on the identification information of the blocks of the past data, and the input characteristic quantity (D114) associated with the block of the input image (D111), the blocks of the past data being motion-compensated by the motion compensation unit 114 and associated with the blocks of the input image (D111).

The patch extraction unit 103, when determining based on the motion likelihood information (D128) that the estimated motion is probable, may increase a modification value for the evaluation value, where the evaluation value is calculated which indicates a similarity between the learned characteristic quantity (D115) identified based on the identification information of the blocks of the past data, and the input characteristic quantity (D114) associated with the block of the input image (D111), the blocks of the past data being motion-compensated by the motion compensation unit 114 and associated with the blocks of the input image (D111). The patch extraction unit 103, only when determining based on the motion likelihood information (D128) that the estimated motion is probable, may modify the evaluation value to a value indicating a similarity greater than that in the case where identification information of the blocks of the past data is not used, where the evaluation value is calculated which indicates a similarity between the learned characteristic quantity (D115) identified based on the identification information of the blocks of the past data, and the input characteristic quantity (D114) associated with the block of the input image (D111), the blocks of the past data being motion-compensated by the motion compensation unit 114 and associated with the blocks of the input image (D111).

More specifically, in the present embodiment, the patch extraction unit 103 retrieves the learned characteristic quantity (D115) with the minimum evaluation value by using the evaluation value which takes a smaller value for a greater similarity between the input characteristic quantity (D114) and the learned characteristic quantity (D115). The patch extraction unit 103 outputs the learned high frequency patch (D116) associated with the retrieved learned characteristic quantity (D115) as an estimated high frequency patch (D117).

The patch extraction unit 103 outputs, as a database index (D125), the database index corresponding to the pair of the retrieved learned characteristic quantity (D115) and the learned high frequency patch (D116).

The patch extraction unit 103, when determining based on the motion likelihood information (D128) that the estimated motion is probable, performs retrieval after modifying the evaluation value to a value smaller than or equal to the evaluation value in the case where no modification is made on the evaluation value at the retrieval according to the learned characteristic quantity (D115) having a database index equal to the motion-compensated database index (D127). On the other hand, when it is determined based on the motion likelihood information (D128) that the estimated motion is not likely, the evaluation value is not modified. The patch extraction unit 103 may always modify the evaluation value regardless of the motion likelihood information (D128).

The adding unit 104 generates an output image by adding the input image (D111) enlarged by the enlargement unit 101, and the learned high frequency patch extracted by the patch extraction unit 103 (D116) together on a block-by-block basis. Specifically, the adding unit 104 generates an output image (D112) by adding the enlarged image (D113) and the estimated high frequency patch (D117) together. Alternatively, the adding unit 104 may generate an output image by adding the input image (D111) and the learned high frequency patch (D116) extracted by the patch extraction unit 103 together on a block-by-block basis.

The learning database 105 stores a plurality of patch pairs, by each of which the learned high frequency patch (D116) which is data obtained from the high frequency components in a learned image is associated with the learned characteristic quantity (D115) which is data obtained from at least the low frequency components in the learned image. The learning database 105 is created in advance in a similar manner as the learning database 905 which has been described with reference to FIG. 12. In the present embodiment, the learning database 105 stores the learned characteristic quantity (D115) and the learned high frequency patch (D116) as an associated patch pair, which have been generated from the same block position, and also stores the association relationship database index (D125) which indicates the association.

Thus, when the database is searched by the patch extraction unit 103, the super-resolution processor 100 according to the present embodiment can reduce image fluctuation in the time direction in the output image by considering a match between the database index and the motion-compensated database index in the preceding and subsequent frames.

Figure 2:
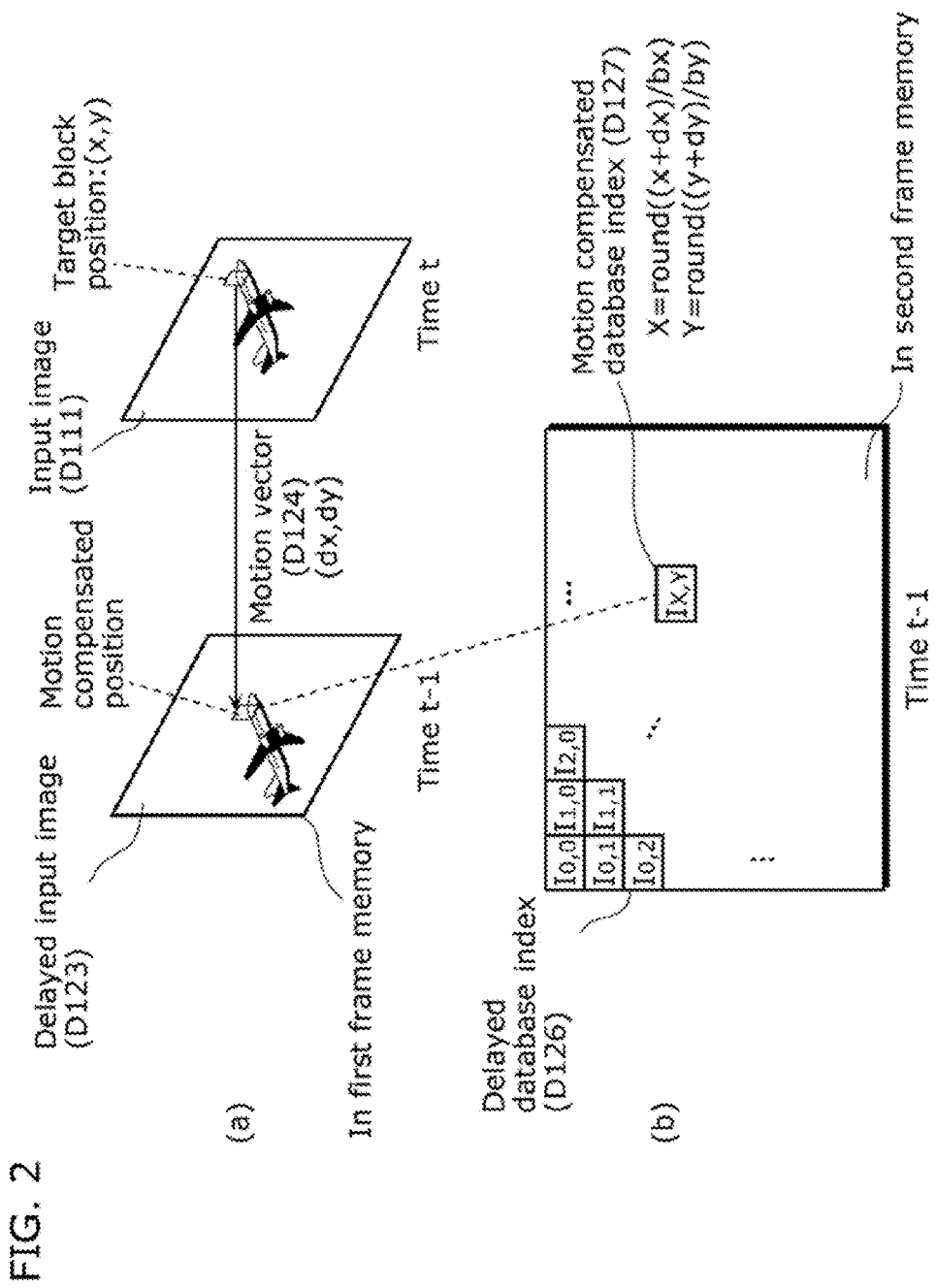
FIG. 2 illustrates an exemplary operation of the super-resolution processor according to Embodiment 1.
Figure 3:
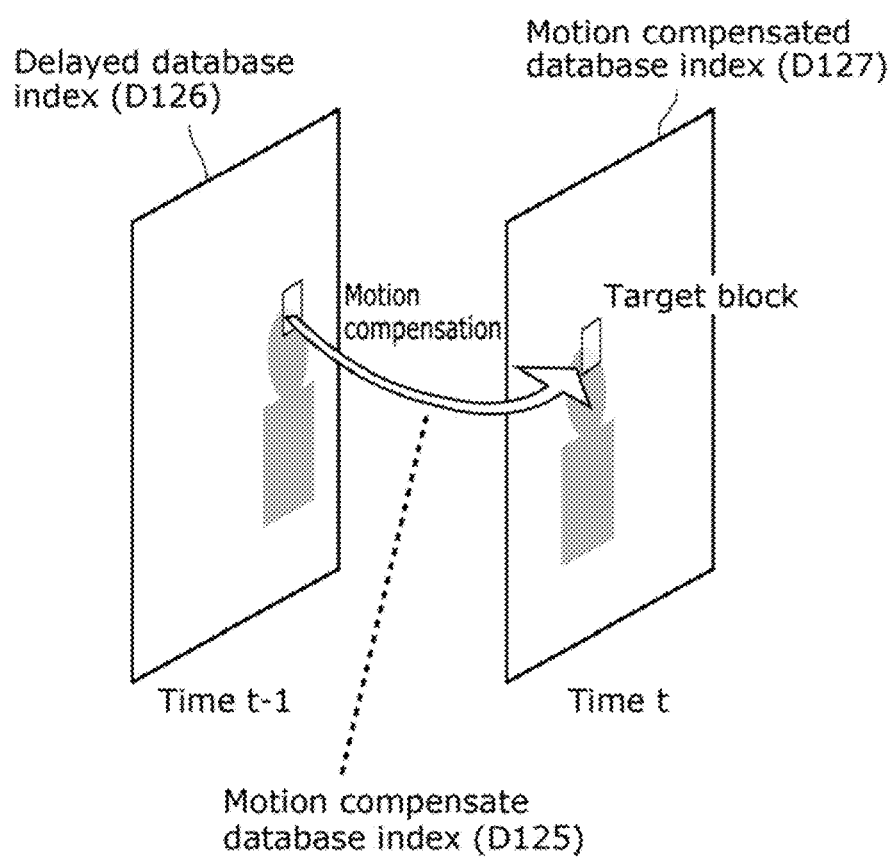
FIG. 3 is an illustration for explaining how a database index for a block in a delayed input image according to Embodiment 1 is motion-compensated to obtain a motion-compensated database index.

FIG. 2 illustrates an exemplary operation of the super-resolution processor according to Embodiment 1. FIG. 3 is an illustration for explaining how a database index for a block in a delayed input image according to Embodiment 1 is motion-compensated to obtain a motion-compensated database index.

Hereinafter, a process of obtaining the motion-compensated database index (D127) will be described. The delayed input image (D123) which is obtained by delaying the input image (D111) by the frame delay unit 111 is provided, for example, at time t−1 where t is the time of the input image.

The delayed input image (D123) may not be a frame immediately preceding the input image (D111), and may be a frame preceding the input image (D111) by two or more frames. The delayed input image (D123) may be a frame subsequent to the input image (D111), i.e., a frame at a time in the future, for example, in the case where previously coded subsequent frame is decoded in MPEG, H.264, or the like. That is to say, the time of the delayed input image (D123) may be t−2, t+1, or any other time.

The input image (D111) illustrated in FIG. 2A is an example where an airplane is flying toward the upper right. As illustrated in FIG. 2A, the position of the airplane in the input image (D111) is moved to the upper right with respect to the position in the delayed input image (D123).

The motion estimation unit 112 searches the delayed input image (D123) stored in the first frame memory 121 to retrieve a block similar to the image of the target block in the input image (D111), and sets the position of the block as the motion-compensated position. The motion estimation unit 112 then calculates a motion vector (D124) which represents the motion quantity from the motion-compensated position to the target block position.

For example, under the assumption that the motion vector (D124) is (dx, dy) and the upper left position of the target block is (x, y), the motion-compensated position (upper left) is given by (x+dx, y+dy). As a motion estimation method, the method described in, for example, Non Patent Literature 2 "section 1.3.2 in Fundamentals of Digital Image Compression by Hiroshi Yasuda and Hiroshi Watanabe, Nikkei BP Publishing Center" may be utilized. It should be noted that any other motion estimation method may be utilized.

The similarity between the target block and the block at the motion-compensated position is determined by SAD (Sum of Absolute Differences) calculation performed on pixels in a block, and is outputted as the motion likelihood information (D128). A method of determining a similarity is not limited to the above method, and any method, for example, the sum of squared differences may be used to determine a similarity. Accordingly, a smaller value of the motion likelihood information (D128) indicates a greater similarity (the estimated motion is probable).

FIG. 2B illustrates a state where the database indexes (D125) at the same time as the delayed input image (D123), which indicate the learned high frequency patch (D116) extracted by the patch extraction unit 103 is stored in the second frame memory 123 by the frame delay unit 113.

Here, the database index (D125) is an index number for uniquely identifying the pair of the learned characteristic quantity (D115) and the learned high frequency patch (D116) in the learning database 105. For example, under the assumption that the unit block size of super-resolution processing is 10×10 pixels, and the size of the input image (D111) is 1920× 1080 pixels, the number of processing blocks per frame is 108×192, and 108×192 pieces of the delayed database index (D126) at the same time as the delayed input image (D123) are stored in the second frame memory 123.

The motion compensated position associated with the target block in the delayed database indexes (D126), which is assumed to be (X, Y) at the two-dimensional position in the second frame memory 123, is determined, for example, by the following.

$$X = \mathrm{round}\left(\frac{x + dx}{bx}\right)$$
$$Y = \mathrm{round}\left(\frac{y + dy}{by}\right)$$

[Expression 1]

where bx and by are respectively horizontal size and vertical size of the unit block of super-resolution processing, and round ( ) is the function which rounds a given number to the nearest integer. Instead of using round ( ), the position may be determined by using any technique for converting to an integer, such as rounding down to the nearest integer, or rounding up to the nearest integer.

The motion-compensated database index (D127) is set as the delayed database index (D126) at the position (X, Y).

That is to say, as illustrated in FIG. 3, the result of processing for the preceding frame, i.e., the delayed input image (D123) is motion-compensated and obtained.

In other words, first, based on the motion estimated by the motion estimation unit 112, the motion compensation unit 114 generates the motion-compensated database index (D127) which motion-compensates the past data on a block-by-block basis, on which the database index (D125) for identifying a learned characteristic quantity (D115) is mapped to each block of the input image in the past, the learned characteristic quantity being extracted correspondingly to the input image (D111) in the past by the patch extraction unit 103.

Subsequently, the patch extraction unit 103 calculates the evaluation value for each learned characteristic quantity (D115) in the learning database 105 based on the motion likelihood information (D128), the input characteristic quantity (D114), and the motion-compensated database index (D127). The patch extraction unit 103 then extracts a learned high frequency patch (D116) from the learning database 105, the learned high frequency patch being associated with the learned characteristic quantity (D115) which is the most similar to the input characteristic quantity (D114) indicated by the calculated evaluation value. In this manner, the learned characteristic quantity (D115) can be retrieved in consideration of continuity of time series, and thus the learned high frequency patch (D116) can be extracted with consideration to continuity of time series.

In the following, a method of calculating an evaluation value (hereinafter denoted by an evaluation value e) by the patch extraction unit 103 will be described.

For example, the patch extraction unit 103 calculates the evaluation value e as follows.

[Expression 2]

$$e = \begin{cases} \mathrm{sad}(InF, TrF) & \text{(in the case where the learning database index is different from motion-compensated database index or where it is determined from the motion the likelihood information that likelihood of motion is low)} \\ \mathrm{sad}(InF, TrF) - c1 & \text{(in the case where the learning database index is the same as motion-compensated database index)} \end{cases}$$

$$\mathrm{sad}(inF, TrF) = \sum_i \sum_j |InF(i, j) - TrF(i, j)|$$

where InF is an input characteristic quantity, TrF is a learned characteristic quantity, (i, j) indicates each element component of the characteristic quantity, sad ( ) is SAD calculation performed on element components of the characteristic quantity, and c1 is a positive constant. For example, when the value of the motion likelihood information (D128) is less than a predetermined threshold value, the motion likelihood is determined to be high, otherwise, the motion likelihood is determined to be low.

For example, the patch extraction unit 103 may calculate the evaluation value e as follows.

[Expression 3]

$$e = \begin{cases} \mathrm{sad}(InF, TrF) & \text{(in the case where the learning database index is different from motion-compensated database index or where it is determined from the motion likelihood information that likelihood of motion is low)} \\ \mathrm{sad}(InF, TrF) * c2 & \text{(except for the above case)} \end{cases}$$

where c2 is a constant and 0<c2<1.

For example, the patch extraction unit 103 may calculate the evaluation value e as follows.

[Expression 4]

$$e = \begin{cases} sad(InF, TrF) & \text{(in the case where the learning database index is different from motion-compensated database index)} \\ sad(InF, TrF) - func1(mc\_sad) & \text{(except for the above case)} \end{cases}$$

where mc_sad is a value of the motion likelihood information (D128) and takes a smaller value for a higher likelihood of estimated motion, and func1( ) is a non-strictly monotonically decreasing function.

For example, the patch extraction unit 103 may calculate the evaluation value e as follows.

[Expression 5]

$$e = \begin{cases} sad(InF, TrF) & \text{(in the case where the learning database index is different from motion-compensated database index)} \\ sad(InF, TrF) * func2(mc\_sad) & \text{(except for the above case)} \end{cases}$$

where func2( ) is a non-strictly monotonically increasing function, and the range of func2( ) is between 0 and 1, inclusive.

The patch extraction unit 103, when calculating the evaluation value e, may use a calculation expression other than the above-described examples. Under the condition that the likelihood of estimated motion is constant, and the similarity between the input characteristic quantity (D114) and the learned characteristic quantity (D115) is constant, a calculation expression may be used which gives an evaluation value e so that an evaluation value e obtained when the learning database index (D125) is the same as the motion-compensated database index (D127) is smaller than an evaluation value e obtained when the learning database index (D125) is different from the motion-compensated database index (D127). Under the condition that the similarity between the input characteristic quantity (D114) and the learned characteristic quantity (D115) is constant, and the learning database index is the same as the motion-compensated database index (D127), a calculation expression may be used which gives an evaluation value e so that when motion likelihood becomes higher, i.e., the value of the motion likelihood information (D128) becomes smaller, the evaluation value e remains the same or becomes smaller.

It may be determined whether or not the learned high frequency patch indicated by the learning database index (D116) is similar to the learned high frequency patch (D116) indicated by the motion-compensated database index (D127). In this case, the evaluation value e is controlled so that the evaluation value e remains the same or becomes smaller for greater similarity. The degree of similarity is obtained, for example, by the SAD calculation performed on learned high frequency patches (D116). Close values of database indexes may be pre-assigned for greater similarity, and the degree of similarity may be determined by only comparing the values of database indexes.

As described above, as long as motion estimation is successful, with smaller evaluation value e of the learned characteristic quantity (D115) which is identified by the motion-compensated database index (D127), the patch extraction unit 103 can easily retrieve (select) a patch. Accordingly, the continuity of time series of the estimated high frequency patch (D117) extracted by the patch extraction unit 103 is increased. When motion estimation fails, a modification quantity to the evaluation value e is reduced, and thus a learned characteristic quantity (D115) which is more similar to the input characteristic quantity is retrieved without considering the continuity of time series. Consequently, the continuity of time-series is taken into consideration as needed, and a stable high-definition output image with less high-frequency fluctuation can be obtained.

[Super-Resolution Processing Method]

Figure 4:
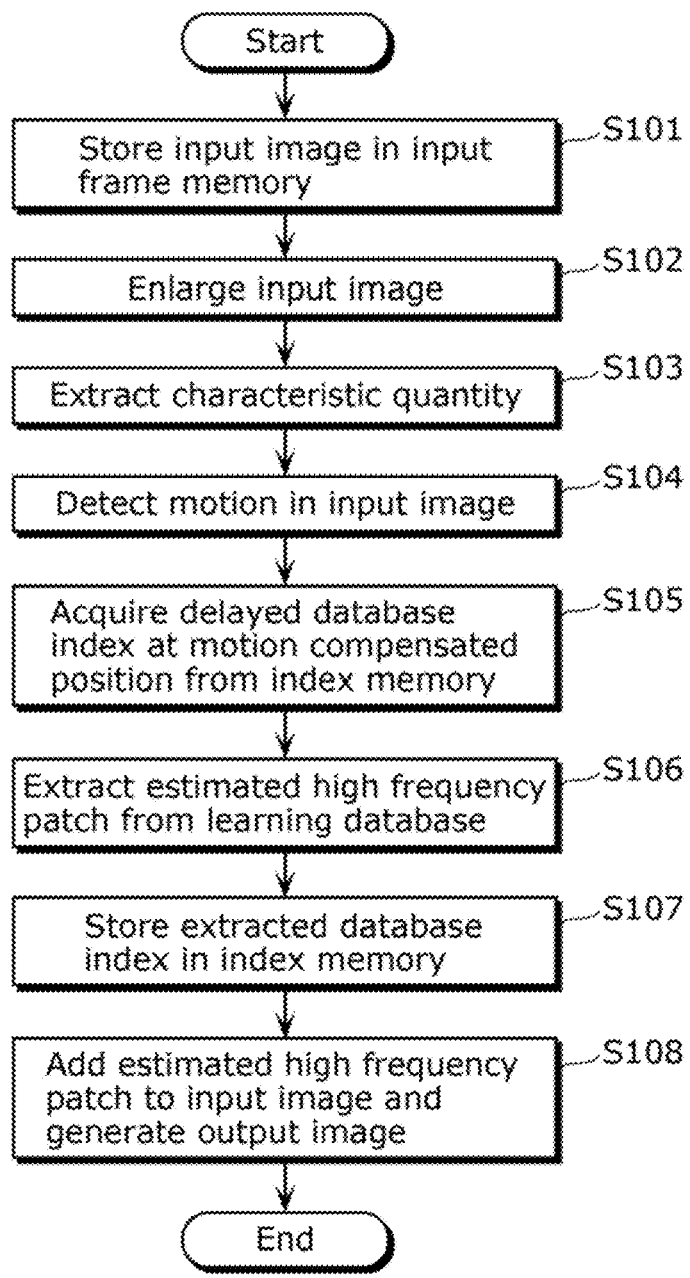
FIG. 4 is a flowchart illustrating super-resolution processing of the super-resolution processor according to Embodiment 1.

FIG. 4 is a flowchart illustrating super-resolution processing of the super-resolution processor 100 according to Embodiment 1.

First, the frame delay unit 111 stores the input image (D111) in the first frame memory 121 (S101).

Subsequently, the enlargement unit 101 generates an enlarged image (D113) which is obtained by enlarging the input image (D111) to a desired size (S102).

In the case where the input image is previously enlarged, or the frequency distribution of the input image is concentrated on low frequency, a super-resolution effect is obtained without increasing the size of the input image. In this case, S102 is skipped, i.e., the enlargement unit B101 is not provided, and thus the enlarged image (D113) is the input image (D111).

Subsequently, the characteristic quantity extraction unit 102 extracts a characteristic quantity from the enlarged image (D113), and outputs the characteristic quantity as the input characteristic quantity (D114) (S103).

Subsequently, the motion estimation unit 112 estimates a motion of an object or the like between the input image (D111) and the delayed input image (D123). The motion estimation unit 112 then outputs the motion vector (D124) which indicates the estimated motion (motion quantity). Here, the delayed input image (D123) is the image data of the preceding frame (the input image in the past), which is stored in the first frame memory 121 in S107. Thus, the above processing is not performed for the first frame to be processed because the preceding frame has not been generated yet. Detection of motion may be performed on a predetermined block-by-block basis, or a divided region may be arbitrarily allocated to each object in the image, and estimation may be performed region by region. Here, the motion estimation unit 112 outputs motion likelihood information (D128) which indicates the likelihood of estimated motion (S104).

Subsequently, the motion compensation unit 114 outputs a motion-compensated database index (D127) which is generated by motion-compensating the delayed database index (D126) according to the motion quantity indicated by the motion vector (D124) obtained in S104. The above processing is not performed for the first frame to be processed because the delayed database index (D126) is generated in the preceding frame in S107, and thus has not been generated for the first frame (S105).

Subsequently, the patch extraction unit 103 retrieves the learned characteristic quantity (D115) with the minimum evaluation value by using the evaluation value which takes a smaller value for a greater similarity between the input characteristic quantity (D114) and the learned characteristic quantity (D115). The patch extraction unit 103 extracts the learned high frequency patch (D116) associated with the retrieved learned characteristic quantity (D115), and outputs the learned high frequency patch (D116) as the estimated high frequency patch (D117) (S106).

The patch extraction unit 103, when determining based on the motion likelihood information (D128) that the estimated motion is probable, performs retrieval after modifying the evaluation value to a value smaller than or equal to the current evaluation value for the learned characteristic quantity (D115) having a database index (D125) equal to the motion-compensated database index (D127). On the other hand, when it is determined based on the motion likelihood information (D128) that the estimated motion is not likely, the evaluation value is not modified. The patch extraction unit 103 may always modify the evaluation value regardless of the motion likelihood information (D128).

Subsequently, the database index (D125) associated with the pair of the learned characteristic quantity (D115) and the learned high frequency patch (D116) which are retrieved and obtained (selected) by the patch extraction unit 103 is stored in the index memory (the second frame memory 123) in the frame delay unit 113 (S107).

Here, the patch extraction unit 103 further performs retrieval after modifying the evaluation value to a value smaller than or equal to the current evaluation value for the learned characteristic quantity (D115) having a database index (D125) equal to the motion-compensated database index (D127).

Subsequently, the adding unit 104 generates an output image (D112) by adding the enlarged image (D113) and the estimated high frequency patch (D117) together (S108).

[Effect]

As described above, the evaluation value for the learned characteristic quantity indicated by the same learning database index as the motion-compensated learning database index in the preceding and subsequent frames is reduced to a smaller value. Accordingly, a patch which is the same as the learned high frequency patch (D116) selected at the motion-compensated position can be likely to be selected, and thus the continuity of time-series of the added estimated high frequency patch (D117) can be improved, and a high-definition output image with less high-frequency fluctuation can be generated.

So far, according to the present embodiment, super-resolution processing for adding a stable high frequency component to the input image can be performed, the high frequency component being resistant to fluctuations in the time direction, and thus it is possible to achieve a super-resolution processor which can suppress occurrence of a flicker among a plurality of time-series image frames.

In Embodiment 1, the learning database 105 is created in advance in a similar manner as the learning database 905 which has been described with reference to FIG. 12, but the invention is not limited to this case.

For example, the learning database 105 may store not only a plurality of patch pairs between the learned characteristic quantity (D115) and the learned high frequency patch (D116), but also a plurality of patch pairs between the learned characteristic quantity (D115) and the learned high frequency patch (D116), which each have undergone image transformation such as rotation or transposition, the learned high frequency patch (D116) being data obtained from the high frequency components in the learned image, and the learned characteristic quantity (D115) being data obtained from at least the low frequency components in the learned image.

In this case, it is preferable to hold image transformation indexes each of which indicates a type of image transformation, along with the database indexes (D125). The patch extraction unit 103 may reduce the evaluation value for a patch for which the database index (D125) at the motion-compensated position matches the image transformation index.

In the following, description is given using an example of patch pairs which each have undergone image transformation such as rotation or transposition.

FIG. 5 illustrates an exemplary patch pairs which each have undergone image transformations stored in a learning database according to Embodiment 1. FIG. 5 illustrates an example where data P120 which indicates L pieces of the learned characteristic quantity (D115) is generated from data P12 which indicates one piece of the learned characteristic quantity (D115). Only a case of generating image-transformed learned characteristic quantities (D115) will be described because a case of generating image-transformed learned high frequency patches (D116) may be similarly described.

In the example of FIG. 5, data P12 which indicates a learned characteristic quantity (D115) is defined as a two-dimensional array, and the data indicating L (=16) pieces of learned characteristic quantities (D115) is generated by flipping the array in the horizontal direction or the vertical direction, transposing the array, or inverting the sign or bit of numeric data for the array elements. In the case where numeric data p as an array element is normalized to, for example, [0, 255], the inversion of the sign of the numeric data is defined by 255−p.

In general, generation of P120 is expressed by the following expression.

$$P120[k][l] = G(P12[k], l) \quad (1)$$

where $G(X, l)$ is a function which generates a new pattern using a parameter l based on X, and $k=1, \ldots, K$. For example, in the example of FIG. 5, the parameter l is such that $l=1, \ldots, L$, A method of generated data indicating L pieces of learned characteristic quantities (D115) is not limited to the above method, and, for example, in the case where the learning database 105 stores data having a size greater than the data size which is used for retrieval by the patch extraction unit 103, an array element may be translated, or the array pattern may be transformed, e.g., rotated by applying an affine transformation or the like. In the case where array data at a non-integer position is necessary, interpolation generation may be performed, for example, by Bicubic technique.

The configuration of patch pairs which are stored in the learning database 105 is not limited to the above case. For example, the learning database 105 may store information such that similar patches are classified into the same class. In this case, the patch extraction unit 103 performs an operation to reduce the evaluation value for the patch (for example, the learned high frequency patch (D116)) belonging to the same class as the motion-compensated database index (D127).

More specifically, in the learning database 105, similar learned high frequency patches (D116) are classified into the same class. In this case, the patch extraction unit 103 may modify the evaluation value to a value indicating a similarity greater than that in the case where identification information of the blocks of the past data is not used, where the evaluation value is calculated which indicates a similarity between a learned characteristic quantity (D115) in a learned high frequency patch (D116) belonging to the same class as the learned high frequency patch (D116) associated with the learned characteristic quantity (D115) which is identified based on the database indexes (D125) of the blocks of the past data, and the input characteristic quantity (D114) associated with the block of the input image (D111), the blocks of the past data being motion-compensated by the motion compensation unit 114 and associated with the blocks of the input image (D111).

K-means technique may be used for the above-described classification, or another classification technique may be used. A classification may be made so that each patch belongs to a plurality of classes. SAD or SSD per pixel unit may be used as an indicator for measuring the above-mentioned degree of similarity, however, another indicator may be used.

[Embodiment 2]

Hereinafter, Embodiment 2 will be described. In the following embodiments, description of the elements similar to those in the above-described embodiment is omitted, and the points of difference will be mainly described. In each embodiment, the same component is labeled with the same reference symbol.

Hereinafter, the super-resolution processor 200 according to

Figure 6:
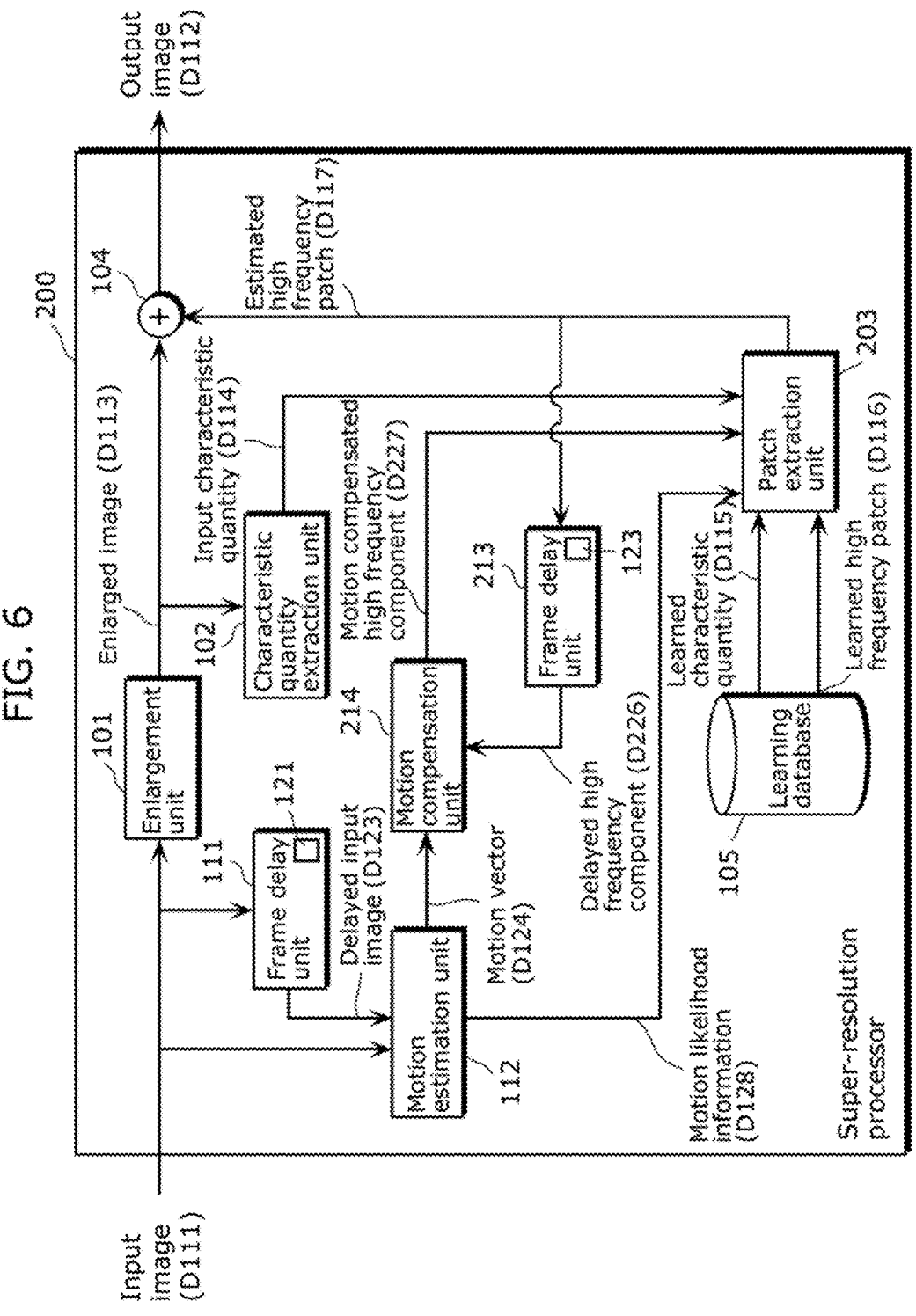
FIG. 6 is a block diagram illustrating the configuration of a super-resolution processor according to Embodiment 2.

Embodiment 2 will be described. FIG. 6 is a block diagram illustrating the configuration of the super-resolution processor according to Embodiment 2. The same components as those in FIG. 1 are labeled with the same reference symbols, and detailed description is omitted.

The super-resolution processor 200 illustrated in FIG. 6 generates an output image (D112) with a resolution greater than that of an input image (D111) by performing super-resolution processing on the input image (D111) using a learning database 105.

The super-resolution processor 200 illustrated in FIG. 6 differs from the super-resolution processor 100 of Embodiment 1 in the configuration of a patch extraction unit 203, a frame delay unit 213, and a motion compensation unit 214. In the case where the input image (D111) is previously enlarged, or the frequency distribution of the input image (D111) is concentrated on low frequency, a super-resolution effect is obtained without increasing the size of the input image (D111). For this reason, the enlargement unit 101 may not be provided similarly to Embodiment 1. In this case, the enlarged image (D113) is replaced by the input image (D111).

The frame delay unit 213 has a second frame memory 123 therein, and delays the estimated high frequency patch (D117) for one frame at each block position frame-by-frame to output a delayed high frequency component (D226).

Based on the motion estimated by the motion estimation unit 112, the motion compensation unit 214 motion-compensates the past data on a block-by-block basis, on which identification information for identifying a learned characteristic quantity (D115) is mapped to each block of the input image in the past, the learned characteristic quantity being extracted correspondingly to the input image (D111) in the past by the patch extraction unit 103. Specifically, the motion compensation unit 214 outputs a motion-compensated high frequency component (D227) by motion-compensating the delayed high frequency component (D226) according to the motion quantity indicated by the motion vector (D124).

The patch extraction unit 203 calculates an evaluation value per block, which indicates a similarity between each of a plurality of learned characteristic quantities (D115) stored in the learning database 105 and the input characteristic quantity (D114), and extracts a learned high frequency patch (D116) from the learning database 105, the learned high frequency patch being associated with the learned characteristic quantity (D115) which is the most similar to the input characteristic quantity (D114) indicated by the calculated evaluation value.

Here, the identification information is the learned high frequency patch (D116) extracted correspondingly to the input image (D111) in the past by the patch extraction unit 203. In the present embodiment, the patch extraction unit 203 modifies the evaluation value to a value indicating a similarity greater than that in the case where identification information of the blocks of the past data is not used, where the evaluation value is calculated which indicates a similarity between the learned characteristic quantity (D115) associated with the learned high frequency patch (D116) of the blocks of the past data, and the input characteristic quantity (D114) associated with the block of the input image (D111), the blocks of the past data being motion-compensated by the motion compensation unit 214 and associated with the blocks of the input image (D111). Other features of the patch extraction unit 203 are similar to those of the above-described patch extraction unit 103, and thus description is omitted.

More specifically, in the present embodiment, the patch extraction unit 203 retrieves the learned characteristic quantity (D115) with the minimum evaluation value by using the evaluation value which takes a smaller value for a greater similarity between the input characteristic quantity (D114) and the learned characteristic quantity (D115). The patch extraction unit 203 outputs the learned high frequency patch (D116) associated with the retrieved learned characteristic quantity (D115) as the estimated high frequency patch (D117).

Here, the patch extraction unit 203 performs retrieval after modifying the evaluation value to a value smaller than or equal to the current evaluation value for a greater similarity between the motion-compensated high frequency component (D227) and the learned high frequency patch (D116). The patch extraction unit 203 further performs retrieval after modifying the evaluation value to a value smaller than or equal to the current evaluation value for a higher likelihood of the estimated motion indicated by the motion likelihood information (D128), i.e., the estimated motion is probable.

Thus, the super-resolution processor 200 according to the present embodiment can reduce image fluctuation in the time direction in the output image by considering a similarity to the motion-compensated database index in the preceding and subsequent frames when a high frequency component which is not present in the enlarged image (D113) is added.

Figure 7:
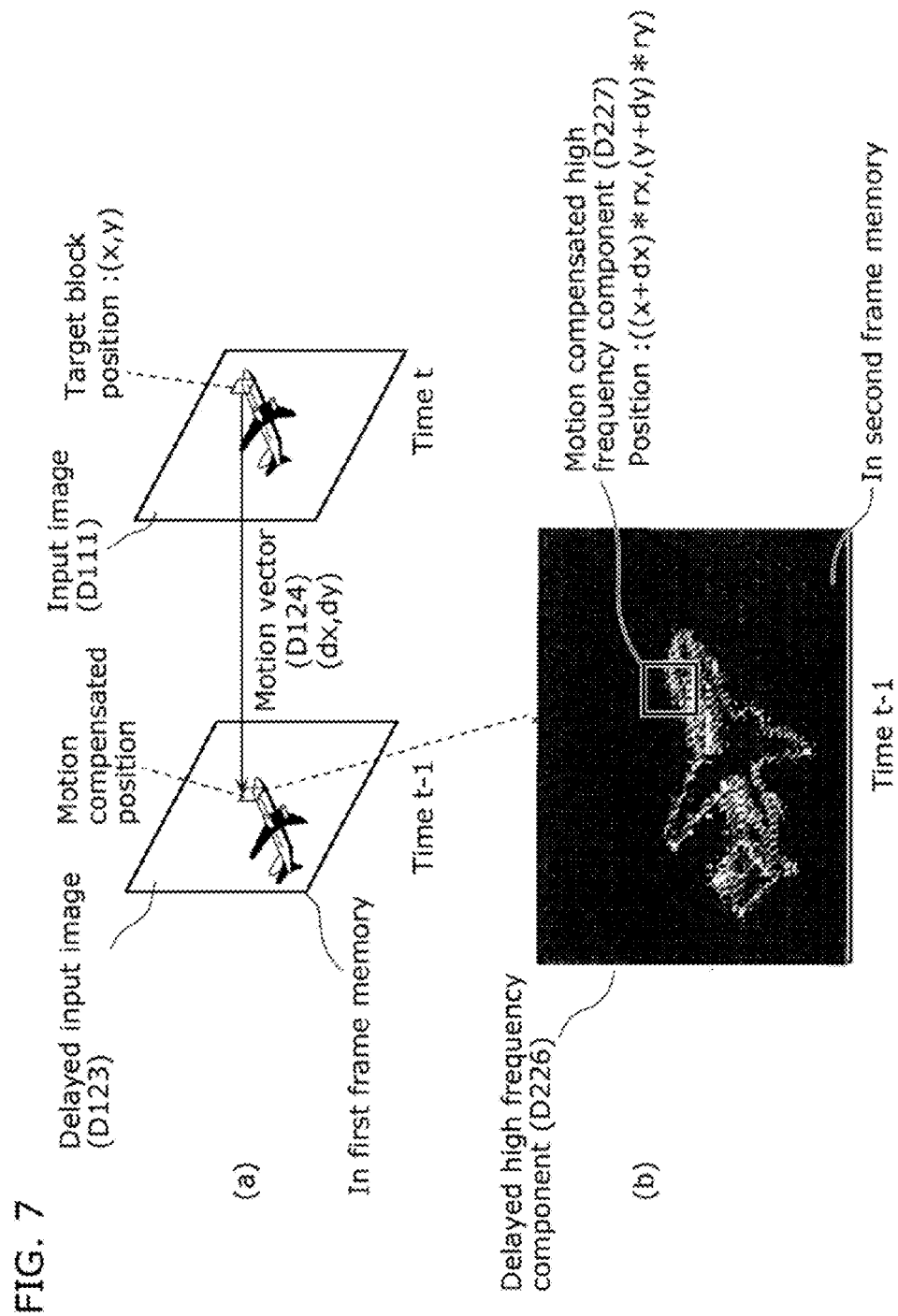
FIG. 7 illustrates an exemplary operation of the super-resolution processor according to Embodiment 2.

FIG. 7 illustrates an exemplary operation of the super-resolution processor according to Embodiment 2.

Hereinafter, a process of obtaining the motion-compensated high frequency component (D227) will be described.

Description of FIG. 7A is the same as that of FIG. 2A, and therefore is omitted. Under the assumption that the motion vector (D124) is (dx, dy) and the upper left position of the target block is (x, y), the motion-compensated position (upper left) is given by (x+dx, y+dy).

FIG. 7B illustrates a state where the estimated high frequency patch (D117) extracted by the patch extraction unit 203, at the same time as the delayed input image (D123) is stored in the second frame memory 123 by the frame delay unit 213.

The image size of one frame of a delayed high frequency component with respect to the image size of one frame of a delayed input image is rx times horizontally and ry times vertically, where the enlargement ratio used by the enlargement unit 101 is rx horizontally and ry vertically. In the case where the enlargement unit 101 is not provided, rx=1 and ry=1.

Therefore, the upper left position (X, Y) of the motion-compensated high frequency component (D227) is determined as follows.

$$X=(x-dx)*rx$$

$$Y=(y-dy)*ry \quad \text{[Expression 6]}$$

Thus, the motion-compensated high frequency component (D227) is set as the delayed high frequency component (D226) of the position (X, Y).

That is to say, the result of processing for the preceding frame, i.e., the delayed input image (D123) is motion-compensated and obtained.

In other words, first, based on the motion estimated by the motion estimation unit 112, the motion compensation unit 214 generates the motion-compensated high frequency component (D227) by motion-compensating the past data on a block-by-block basis, on which the estimated high frequency patch (D117) is mapped to each block of the input image in the past, the estimated high frequency patch being extracted correspondingly to the input image (D111) in the past by the patch extraction unit 103.

Subsequently, the patch extraction unit 203 calculates the evaluation value for each learned characteristic quantity (D115) in the learning database 105 based on the input characteristic quantity (D114) and the motion-compensated high frequency component (D227). The patch extraction unit 203 then extracts a learned high frequency patch (D116) from the learning database 105, the learned high frequency patch being associated with the learned characteristic quantity (D115) which is the most similar to the input characteristic quantity (D114) indicated by the calculated evaluation value. In this manner, the learned characteristic quantity (D115) can be retrieved in consideration of continuity of time-series, and thus the learned high frequency patch (D116) can be extracted with consideration to continuity of time-series.

In the following, a method of calculating an evaluation value (hereinafter denoted by an evaluation value e) by the patch extraction unit 203 will be described.

For example, the patch extraction unit 203 calculates the evaluation value e as follows.

[Expression 7]

$$e = \begin{cases} sad(InF, TrF) & \text{(in the case where it is determined from the motion the likelihood information that likelihood of motion is low)} \\ sad(InF, TrF) + func3(sad(MCTrH, TrH)) & \text{(except for the above case)} \end{cases}$$

where InF is an input characteristic quantity, TrF is a learned characteristic quantity, MCTrH is a motion-compensated high frequency component, TrH is a learned high frequency patch (D116), and sad( ) is SAD calculation (for summing the absolute differences) performed on element components of the characteristic quantity. Here, func3( ) is a non-strictly monotonically increasing function, and the range of func3( ) is less than or equal to 0.

For example, the patch extraction unit 203 may calculate the evaluation value e as follows.

[Expression 8]

$$e = \begin{cases} sad(InF, TrF) & \text{(in the case where it is determined from the motion the likelihood information that likelihood of motion is low)} \\ sad(InF, TrF) * func4(sad(MCTrH, TrH)) & \text{(except for the above case)} \end{cases}$$

where func4( ) is a non-strictly monotonically increasing function, and the range of func4( ) is between 0 and 1, inclusive.

For example, the patch extraction unit 203 may calculate the evaluation value e as follows.

$$e=sad(InF,TrF)+func5(mc\_sad)*func6(sad(MCTrH, TrH)) \quad \text{[Expression 9]}$$

where mc_sad is a value of the motion likelihood information (D128) and takes a smaller value for a higher likelihood of estimated motion, and func5( ) and func6( ) are non-strictly monotonically increasing functions.

The patch extraction unit 203, when calculating the evaluation value e, may use a calculation expression other than the above-described examples. Under the condition that the likelihood of estimated motion is constant, and the similarity between the input characteristic quantity (D114) and the learned characteristic quantity (D115) is constant, the patch extraction unit 203 may use a calculation expression which takes the same or a smaller value for a greater similarity between the learned high frequency patch (D116) and the motion-compensated high frequency component (D227). Under the similarity between the input characteristic quantity (D114) and the learned characteristic quantity (D115) is constant, and the similarity between the learned high frequency patch (D116) and the motion-compensated high frequency component (D227) is constant, the patch extraction unit 203 may use a calculation expression which takes the same or a smaller value for a higher likelihood of estimated motion.

As described above, as long as motion estimation is successful, the evaluation value e tends to be small for a greater similarity between the learned characteristic quantity (D115) and the motion-compensated high frequency component (D227). Accordingly, retrieval (selection) by the patch extraction unit 103 is likely to occur, and thus the continuity of time-series of the estimated high frequency patch (D116) is increased. When motion estimation fails, a modification quantity to the evaluation value e is reduced, and thus a learned characteristic quantity (D115) which is more similar to the input characteristic quantity is retrieved without considering the continuity of time-series. Consequently, the continuity of time-series is taken into consideration as needed, and a stable high-definition output image with less high-frequency fluctuation can be obtained.

[Super-Resolution Processing Method]

FIG. 8 is a flowchart illustrating a super-resolution processing method performed by the super-resolution processor 200 according to Embodiment 2.

The steps similar to those described in FIG. 4 will not be described. Specifically, S201 to S204, and S208 perform similarly to S101 to S204, and S108 in FIG. 4, and thus description thereof is omitted.

In S205, the motion compensation unit 214 outputs the motion-compensated high frequency component (D227) which is generated by motion-compensating the delayed high frequency component (D226) according to the motion quantity indicated by the motion vector (D124) determined in S104. The above processing is not performed for the first frame to be processed because the delayed high frequency component (D226) is generated in the preceding frame in S207, and thus has not been generated for the first frame (S205).

Subsequently, the patch extraction unit 203 retrieves the learned characteristic quantity (D115) with the minimum evaluation value by using the evaluation value which takes a smaller value for a greater similarity between the input characteristic quantity (D114) and the learned characteristic quantity (D115). The patch extraction unit 203 extracts the learned high frequency patch (D116) associated with the retrieved learned characteristic quantity (D115), and outputs the learned high frequency patch as the estimated high frequency patch (D117) (S206).

Subsequently, the patch extraction unit 203 stores the extracted estimated high frequency patch (D117) in the index memory (the second frame memory 123) in the frame delay unit 213 (S207).

Here, the patch extraction unit 203 further performs retrieval after modifying the evaluation value to a value smaller than or equal to the current evaluation value for a greater similarity between the motion-compensated high frequency component (D227) and the learned high frequency patch (D116).

[Effect]

As described above, when the learned high frequency patch (D116) is similar to the motion-compensated high frequency component (D227) in the preceding and subsequent frames, the evaluation value is reduced to a smaller value. Accordingly, the learned high frequency patch (D116) selected at the motion-compensated position can be likely to be selected, and thus the continuity of time-series of the added estimated high frequency patch (D117) can be improved, and a high-definition output image with less high-frequency fluctuation can be generated.

So far, according to the present embodiment, super-resolution processing for adding a stable high frequency component to the input image can be performed, the high frequency component being resistant to fluctuations in the time direction, and thus it is possible to achieve a super-resolution processor which can suppress occurrence of a flicker among a plurality of time-series image frames.

In the present embodiment, it has been described that the learning database 105 is created in advance in a similar manner as the learning database 905 which has been described with reference to FIG. 12, but the invention is not limited to this case.

For example, similarly to Embodiment 1, the learning database 105 may store not only a plurality of patch pairs between the learned characteristic quantity (D115) and the learned high frequency patch (D116), but also a plurality of patch pairs between the learned characteristic quantity (D115) and the learned high frequency patch (D116), which each have undergone image transformation such as rotation or transposition, the learned high frequency patch (D116) being data obtained from the high frequency components in the learned image, and the learned characteristic quantity (D115) being data obtained from at least the low frequency components in the learned image.

That is to say, the patch extraction unit 203 may select the learned high frequency patch (D116) from the patch pairs which each have undergone image transformation such as rotation or transposition, the patch pairs being stored in the learning database 105, and may utilize the learned high frequency patch as the estimated high frequency patch (D117). In this case, the patch extraction unit 203 preferably evaluates a similarity between the motion-compensated image, and the learned high frequency patch (D116) which is transformed from the learned high frequency patch (D116) of the learning database 105.

[Embodiment 3]

In addition, a program for achieving the configuration of the super-resolution processing method shown in each of the above-described embodiments may be recorded on a storage medium such as a flexible disk, thereby enabling the processing shown in each of the above-described embodiments to be easily executed in an independent computer system.

Figure 9A:
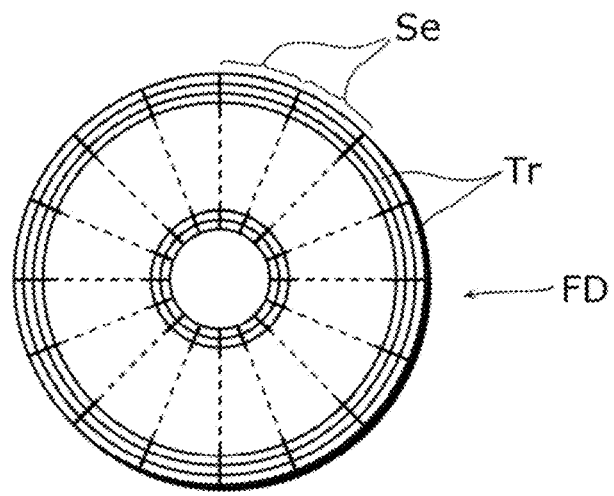
FIG. 9A illustrates an exemplary physical format of a recording medium according to Embodiment 3.
Figure 9B:
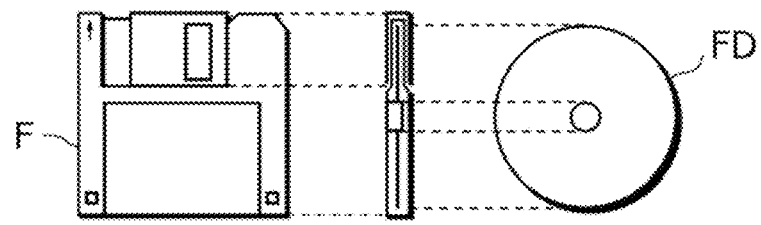
FIG. 9B illustrates the configuration of the recording medium according to Embodiment 3.
Figure 9C:
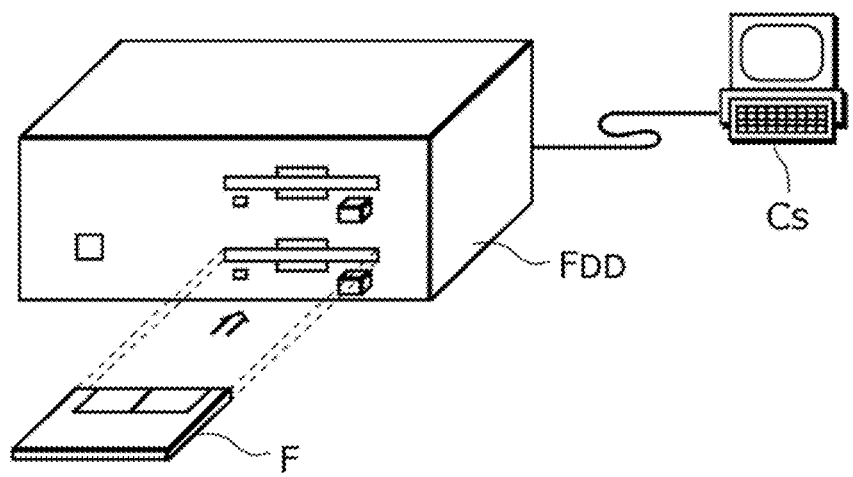
FIG. 9C illustrates the configuration of a computer system according to Embodiment 3.

FIGS. 9A to 9C are explanatory diagrams in the case where the super-resolution processing method is executed according to Embodiment 3 of the present invention by a computer system using a flexible disk which stores the super-resolution processing method in the above-described Embodiment 1 or 2.

FIG. 9B illustrates the external appearance of a flexible disk as viewed from the front, the cross-section structure of the flexible disk, and the flexible disk. FIG. 9A illustrates an example of physical format of the flexible disk which is the main body of a recording medium. Flexible disk FD is built in case F, a plurality of tracks Tr are concentrically formed from the outer circumference to the inner circumference on the surface of the disk, and each track is divided into 16 sectors Se in the angular direction. Thus, in the flexible disk FD which stores the above-mentioned program, the super-resolution processing method as the program is recorded on the region allocated to the above flexible disk FD.

FIG. 9C illustrates the configuration for performing record/reproduction of the above-mentioned program on the flexible disk FD. When the program is recorded on the flexible disk FD, the super-resolution processing method as the program is written from computer system Cs via flexible disk drive FDD. When the super-resolution processing method is built in the computer system by a program in the flexible disk FD, the program is read from the flexible disk FD by the flexible disk drive FDD, and is transferred to the computer system Cs.

In the above description, a flexible disk is used as a recording medium for the description, however, an optical disk may be used similarly. The recording medium is not limited to the above, and the super-resolution processing method can be similarly executed on any entity in which a program can be recorded, such as a hard disk, a CD-ROM, a memory card, or a ROM cassette.

[Embodiment 4]

A super-resolution processor, a super-resolution processing method, and a television receiver using a super-resolution processing program in Embodiment 4 of the present invention will be described with reference to FIG. 10.

Figure 10:
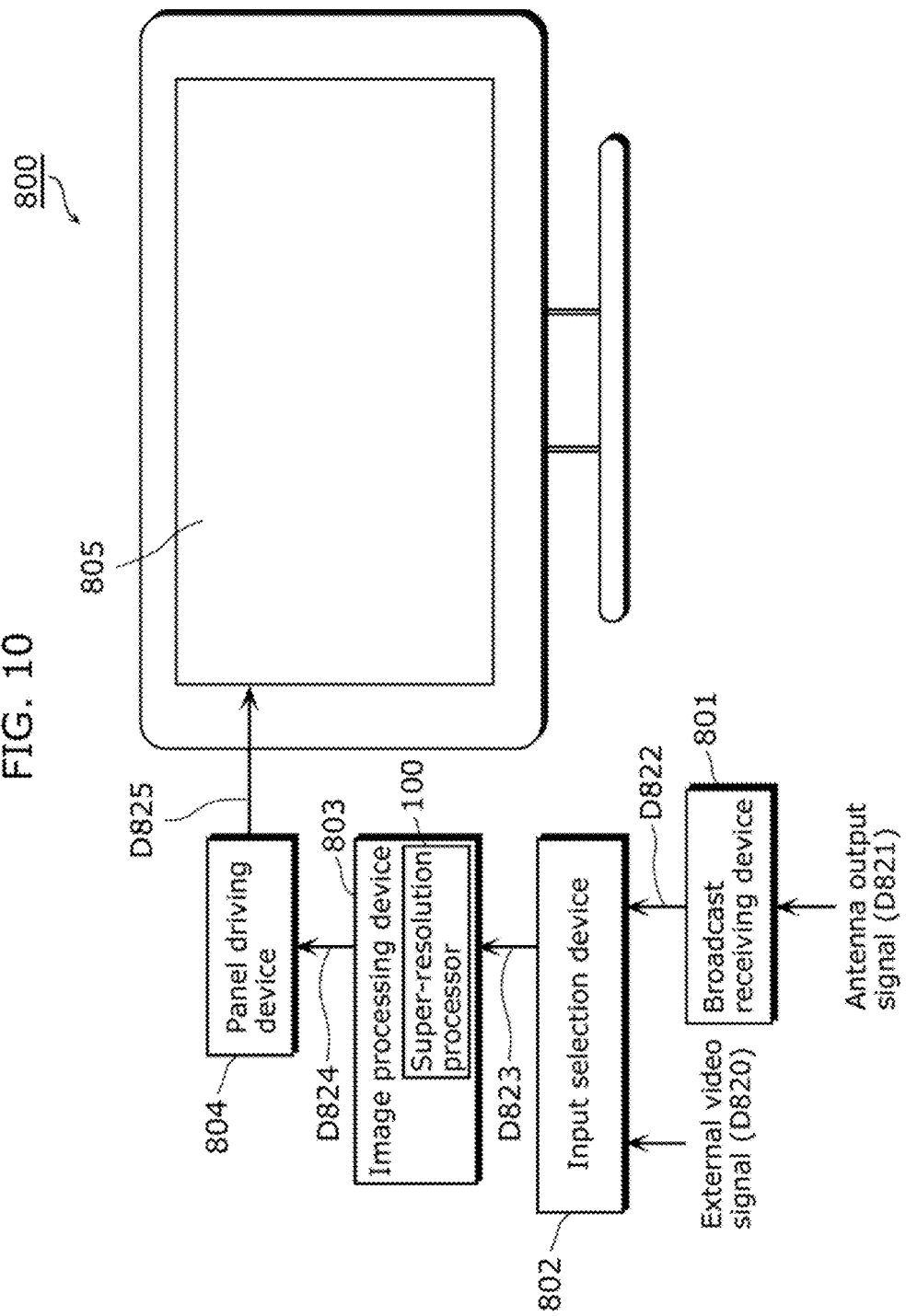
FIG. 10 is a block diagram of a television receiver according to Embodiment 4.

FIG. 10 is a block diagram of a television receiver according to Embodiment 4.

A television receiver 800 includes a broadcast receiving device 801, an input selection device 802, an image processing device 803, a panel driving device 804, and a display panel 805. In FIG. 10, the devices 801 to 804 are illustrated outside the television receiver 800 for the convenience of description, however, the devices are actually disposed inside the television receiver 800.

The broadcast receiving device 801 receives broadcast radio waves from an antenna output signal (D821) outputted from an external antenna (not shown), and outputs a video signal as a broadcast video signal (D822), the video signal being obtained by demodulating the broadcast radio waves.

The input selection device 802 selects either one of external video signal (D820) or broadcast video signal (D822) according to selection by a user, the external video signal being outputted from an external video device such as a DVD or BD (Blu-ray Disc) recorder, or a DVD or BD player. The input selection device 802 outputs the selected video signal as an input video signal (D823).

When the input video signal (D823) is an interlace signal, the image processing device 803 performs I/P conversion to convert the input video signal (D823) to a progressive signal, or performs image-quality-improvement processing on the input video signal (D823) to improve its contrast. The image processing device 803 includes the super-resolution processor 100 according to Embodiment 1 of the present invention, and performs super-resolution processing on the input video signal (D823) by using the super-resolution processing method or the super-resolution processing program described above. The image processing device 803 then outputs a result as an image-quality-improved video signal (D824). The image processing device 803 may include a super-resolution processor according to Embodiment 2.

The panel driving device 804 converts the image-quality-improved video signal (D824) to a dedicated signal for driving the display panel 805, and outputs the converted signal as a video signal for panel drive (D825).

The display panel 805 converts an electrical signal to an optical signal according to the video signal for panel drive (D825), and displays a desired image based on the converted optical signal.

In this manner, the super-resolution processor, the super-resolution processing method, and the super-resolution processing program in the above-described embodiments can be used in the television receiver 800. The television receiver 800 can provide the effect described in the above-described embodiment. The super-resolution processor, the super-resolution processing method, and the super-resolution processing program in the above-described embodiments may be used not only in a television receiver, but also in various digital video devices such as a recorder device, a player device, and a mobile device in a similar manner, and in any case, the effects described in the above-described embodiments can be obtained. Here, a recorder device may be a DVD recorder, a BD recorder, a hard disk recorder, or the like. A player device is, for example, a DVD player, a BD player, or the like. A mobile device is a mobile phone, a PDA (Personal Digital Assistant), or the like.

[Other Modifications]

Although the present invention has been described based on the above embodiments, it is needless to say that the present invention is not limited to the above-described embodiments. The following cases are also included in the present invention.

(1) Specifically, each of the above-described devices is a computer system including a microprocessor, a ROM, a RAM, a hard disk unit, a display unit, a keyboard, and a mouse. The RAM or the hard disk unit stores a computer program. Each device achieves its function by the microprocessor operating according to the computer program. Here, the computer program includes a plurality of command codes in combination each providing an instruction to a computer in order to achieve a predetermined function.

(2) Part or all of the components that constitute each of the above-mentioned devices may be configured with a single system LSI (Large Scale Integration). The system LSI is a super multifunctional LSI which is manufactured by integrating a plurality of constituting portions on a single chip, and specifically is a computer system which includes a microprocessor, a ROM, and/or a RAM. The RAM stores a computer program. The system LSI achieves its function by the microprocessor operating according to the computer program.

(3) Part or all of the components that constitute each of the above-mentioned devices may be configured with an IC card or a single module which is detachably attached to each device. The IC card or the module is a computer system including a microprocessor, a ROM, a RAM, and the like. The IC card or the module may include the above-mentioned super-multifunctional LSI. The IC card or the module achieves its function by an operation of the microprocessor according to the computer program. The IC card or the module may have tamper-resistance.

(4) The present invention may be a method described above. In addition, the invention may be a computer program which achieves these methods by a computer, or may be a digital signal including the computer program.

In addition, the present invention may be a computer-readable recording medium, for example, a flexible disk, a hard disk, a CD-ROM, an MO (Magneto Optical Disc), a DVD, a DVD-ROM, a DVD-RAM, a BD, a semiconductor memory, or the like, in which the computer program or the digital signal is recorded. In addition, the present invention may be the digital signal recorded in one of these recording media.

In addition, the present invention may be transmission medium through which the computer program or the digital signal is transmitted via an electric telecommunication line, a wireless or wire communication line, a network represented by Internet, or data broadcasting.

In addition, the present invention may be a computer system including a microprocessor and a memory where the above-mentioned computer program is recorded in the memory, and the microprocessor operates according to the computer program.

In addition, the program or the digital signal may be recorded in the recording medium and transferred, or the program or the digital signal may be transferred via the network so as to be executed by another independent computer system.

(5) The above-described embodiments and modifications may be combined with each other.

Industrial Applicability

The present invention may be applied to a super-resolution processor. The present invention is useful for a digital video device such as a television receiver, a DVD recorder, a BD recorder, a hard disk recorder, a DVD player, and a BD player. The present invention is useful for a super-resolution processing method and a super-resolution processing program.

The invention claimed is:

1. A super-resolution processor which performs super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the super-resolution processor comprising:

a characteristic quantity extraction unit configured to extract a characteristic quantity from the input image on a block-by-block basis;

a patch extraction unit configured to calculate, on a block-by-block basis, an evaluation value which indicates a similarity between each of the learned characteristic quantities stored in the learning database and a characteristic quantity, and to extract a learned high frequency patch from the learning database, the learned high frequency patch being associated with a learned characteristic quantity most similar to the characteristic quantity indicated by the calculated evaluation value;

a motion estimation unit configured to estimate a motion on a block-by-block basis between the input image and a past input image which is an image preceding the input image;

a motion compensation unit configured to motion-compensate past data on a block-by-block basis based on the motion estimated by the motion estimation unit, the past data being data in which identification information for identifying a learned characteristic quantity is mapped to a corresponding block of the past input image on a block-by-block basis, the learned characteristic quantity being extracted correspondingly to the past input image by the patch extraction unit; and an adding unit configured to generate the output image by adding together on a block-by-block basis the input image and the learned high frequency patch extracted by the patch extraction unit, wherein the patch extraction unit is configured to calculate the evaluation value, and modify the evaluation value to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

2. The super-resolution processor according to claim 1, wherein the identification information is a database index for identifying a learned high frequency patch extracted correspondingly to the past input image by the patch extraction unit, and a learned characteristic quantity associated with the learned high frequency patch, and the patch extraction unit is configured to modify the evaluation value to a value indicating a similarity greater than a similarity in the case where the identification information of the block of the past data is not used, where the evaluation value is calculated which indicates a similarity between the learned characteristic quantity identified based on the database index of the block of the past data, and the characteristic quantity associated with the block of the input image, the block of the past data being motion-compensated by the motion compensation unit and associated with the block of the input image.

3. The super-resolution processor according to claim 2, wherein in the learning database, learned high frequency patches similar to each other are classified in a same class, and the patch extraction unit is configured to modify the evaluation value to a value indicating a similarity greater than a similarity in the case where the identification information of the block of the past data is not used, where the evaluation value is calculated which indicates a similarity between a learned characteristic quantity in a learned high frequency patch belonging to the same class as the learned high frequency patch associated with the learned characteristic quantity which is identified based on the database index of the block of the past data, and the characteristic quantity associated with the block of the input image, the block of the past data being motion-compensated by the motion compensation unit and associated with the block of the input image.

4. The super-resolution processor according to claim 1, wherein the identification information is a learned high frequency patch extracted correspondingly to the past input image by the patch extraction unit, and the patch extraction unit is configured to modify the evaluation value to a value indicating a similarity greater than a similarity in the case where the identification information of the block of the past data is not used, where the evaluation value is calculated which indicates a similarity between the learned characteristic quantity associated with a learned high frequency patch of the block of the past data, and the characteristic quantity associated with the block of the input image, the block of the past data being motion-compensated by the motion compensation unit and associated with the block of the input image.

5. The super-resolution processor according to claim 1, wherein the evaluation value is smaller when the similarity is greater, and the patch extraction unit is configured to modify the evaluation value to a value which is reduced by $c1$ ($c1 > 0$) from the evaluation value in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the blocks of the input image.

6. The super-resolution processor according to claim 1, wherein the evaluation value is smaller when the similarity is greater, and the patch extraction unit is configured to modify the evaluation value to a value which is a product between $c2$ ($0 < c24 < 1$) and the evaluation value in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

7. The super-resolution processor according to claim 1, wherein the motion estimation unit is further configured to calculate motion likelihood information which indicates a likelihood of the estimated motion, and the patch extraction unit, when determining based on the motion likelihood information that the estimated motion is probable, is configured to increase a modification value for the evaluation value, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

8. The super-resolution processor according to claim 1, wherein the motion estimation unit is further configured to calculate motion likelihood information which indicates a likelihood of the estimated motion, and the patch extraction unit, only when determining based on the motion likelihood information that the estimated motion is probable, is configured to modify the evaluation value to a value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

9. The super-resolution processor according to claim 8, wherein the motion likelihood information indicates a higher likelihood of the estimated motion for a greater similarity between the block of the past data motion-compensated by the motion compensation unit, and the block of the input image corresponding to the block of the past data.

10. The super-resolution processor according to claim 8, wherein the motion likelihood information includes a sum of absolute differences between pixels of the block of the past data motion-compensated by the motion compensation unit and pixels of a target block of the input image, the target block corresponding to the block of the past image.

11. The super-resolution processor according to claim 10, wherein in the motion likelihood information, a smaller value of the sum of absolute difference indicates a greater similarity between the block of the past data motion-compensated by the motion compensation unit, and the block of the input image corresponding to the block of the past data.

12. The super-resolution processor according to claim 1, further comprising an enlargement unit configured to enlarge the input image to a desired image size and to output the enlarged input image, wherein the characteristic quantity extraction unit is configured to extract a characteristic quantity from the input image enlarged by the enlargement unit, and the adding unit is configured to generate the output image by adding together the input image enlarged by the enlargement unit, and the learned high frequency patch extracted by the patch extraction unit on a block-by-block basis.

13. A super-resolution processing method for performing super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the super-resolution processing method:

extracting a characteristic quantity from the input image on a block-by-block basis;

calculating, on a block-by-block basis, an evaluation value which indicates a similarity between each of the learned characteristic quantities stored in the learning database and a characteristic quantity, and extracting a learned high frequency patch from the learning database, the learned high frequency patch being associated with a learned characteristic quantity most similar to the characteristic quantity indicated by the calculated evaluation value;

estimating a motion on a block-by-block basis between the input image and a past input image which is an image preceding the input image;

motion-compensating past data on a block-by-block basis based on the motion estimated in the estimating, the past data being data in which identification information for identifying a learned characteristic quantity is mapped to a corresponding block of the past input image on a block-by-block basis, the learned characteristic quantity being extracted correspondingly to the past input image in the extracting of a learned high frequency patch; and generating the output image by adding together on a block-by-block basis the input image and the learned high frequency patch extracted in the extracting of a learned high frequency patch, wherein in the extracting of a learned high frequency patch, the evaluation value is calculated, and modified to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated in the motion-compensating and associated with the block of the input image.

14. A non-transitory computer-readable recording medium on which a program is recorded for performing super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the program causing a computer to execute:

extracting a characteristic quantity from the input image on a block-by-block basis;

calculating, on a block-by-block basis, an evaluation value which indicates a similarity between each of the learned characteristic quantities stored in the learning database and a characteristic quantity, and extracting a learned high frequency patch from the learning database, the learned high frequency patch being associated with a learned characteristic quantity most similar to the characteristic quantity indicated by the calculated evaluation value;

estimating a motion on a block-by-block basis between the input image and a past input image which is an image preceding the input image;

motion-compensating past data on a block-by-block basis based on the motion estimated in the estimating, the past data being data in which identification information for identifying a learned characteristic quantity is mapped to a corresponding block of the past input image on a block-by-block basis, the learned characteristic quantity being extracted correspondingly to the past input image in the extracting of a learned high frequency patch; and generating the output image by adding together on a block-by-block basis the input image and the learned high frequency patch extracted in the extracting of a learned high frequency patch, wherein in the extracting of a learned high frequency patch, the evaluation value is calculated and modified to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated in the motion-compensating and associated with the block of the input image.

15. An integrated circuit which performs super-resolution processing on an input image using a learning database to generate an output image with a resolution higher than a resolution of the input image, the learning database storing a plurality of patch pairs, in each of which a learned high frequency patch which is data obtained from a high frequency component in a learned image is associated with a learned characteristic quantity which is data obtained from at least a low frequency component in the learned image, the integrated circuit comprising:

a characteristic quantity extraction unit configured to extract a characteristic quantity from the input image on a block-by-block basis;

a patch extraction unit configured to calculate, on a block-by-block basis, an evaluation value which indicates a similarity between each of the learned characteristic quantities stored in the learning database and a characteristic quantity, and to extract a learned high frequency patch from the learning database, the learned high frequency patch being associated with a learned characteristic quantity most similar to the characteristic quantity indicated by the calculated evaluation value;

a motion estimation unit configured to estimate a motion on a block-by-block basis between the input image and a past input image which is an image preceding the input image;

a motion compensation unit configured to motion-compensate past data on a block-by-block basis based on the motion estimated by the motion estimation unit, the past data being data in which identification information for identifying a learned characteristic quantity is mapped to a corresponding block of the past input image on a block-by-block basis, the learned characteristic quantity being extracted correspondingly to the past input image by the patch extraction unit; and an adding unit configured to generate the output image by adding together on a block-by-block basis the input image and the learned high frequency patch extracted by the patch extraction unit, wherein the patch extraction unit is configured to calculate the evaluation value, and modify the evaluation value to a value in the case where the identification information of the block of the past data is used, the value indicating a similarity greater than a similarity in the case where the identification information of the block of the past data is not used, where the evaluation value is calculated which indicates a similarity between the learned characteristic quantity identified based on the identification information of the block of the past data, and the characteristic quantity associated with the block of the input image, the block of the past data being motion-compensated by the motion compensation unit and associated with the block of the input image.

* * * * *